United States Patent
Kato

(10) Patent No.: US 8,261,292 B2
(45) Date of Patent: *Sep. 4, 2012

(54) INFORMATION PROCESSING APPARATUS, METHOD OF CONTROLLING THE SAME, PROGRAM, AND RECORDING MEDIUM

(75) Inventor: Masahito Kato, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 699 days.

This patent is subject to a terminal disclaimer.

(21) Appl. No.: 12/177,667

(22) Filed: Jul. 22, 2008

(65) Prior Publication Data

US 2008/0307443 A1    Dec. 11, 2008

Related U.S. Application Data

(62) Division of application No. 10/742,834, filed on Dec. 23, 2003, now Pat. No. 7,430,745.

(30) Foreign Application Priority Data

Dec. 27, 2002  (JP) .................................. 2002-382601
Jun. 20, 2003  (JP) .................................. 2003-176688

(51) Int. Cl.
*G06F 9/44*  (2006.01)
*G06F 15/177*  (2006.01)

(52) U.S. Cl. ...................................... 719/321; 709/221

(58) Field of Classification Search .................. 719/321; 709/221

See application file for complete search history.

(56) References Cited

U.S. PATENT DOCUMENTS

| 6,149,323 A | 11/2000 | Shima .............................. 400/76 |
| 6,243,773 B1 | 6/2001 | Mahalingam .................. 710/103 |
| RE37,258 E * | 7/2001 | Patel et al. .................... 358/1.15 |
| 6,697,073 B1 * | 2/2004 | Kadota .......................... 345/501 |
| 6,697,090 B1 * | 2/2004 | Nagasaka et al. ............. 715/769 |
| 7,016,060 B1 | 3/2006 | Carney et al. ................ 358/1.15 |
| 7,043,576 B2 | 5/2006 | Nakamura ..................... 710/104 |
| 2001/0039611 A1 | 11/2001 | Lin et al. ............................ 713/1 |
| 2002/0165984 A1 | 11/2002 | Yuki ............................. 709/245 |
| 2003/0084132 A1 * | 5/2003 | Ohta .............................. 709/221 |
| 2003/0128230 A1 | 7/2003 | Wugofski ...................... 345/734 |
| 2004/0024787 A1 * | 2/2004 | Edwards et al. .............. 707/200 |
| 2004/0267797 A1 | 12/2004 | Wilson .......................... 707/101 |

FOREIGN PATENT DOCUMENTS

| EP | 0 116 694 | 8/1984 |
| EP | 1 209 562 | 5/2002 |
| JP | 04-322324 | 11/1992 |
| JP | 09-006557 A | 1/1997 |
| JP | 09-146731 A | 6/1997 |
| JP | 2000-353079 A | 12/2000 |
| JP | 2001-027922 A | 1/2001 |
| JP | 2001-216246 A | 8/2001 |
| JP | 2002-118574 A | 4/2002 |
| JP | 2002-123380 A | 4/2002 |
| JP | 2002-189546 | 7/2002 |

* cited by examiner

*Primary Examiner* — Andy Ho
*Assistant Examiner* — Abdou Seye
(74) *Attorney, Agent, or Firm* — Fitzpatrick, Cella, Harper & Scinto

(57) ABSTRACT

If a new device object matching at least a portion of device information concerning a device of an existing device object is detected, the device information of the existing device object is acquired, and the existing device object is deleted. Device information of the new device object is updated by using the acquired device information.

23 Claims, 22 Drawing Sheets

| PRINTER INFORMATION | |
|---|---|
| · PRINTER SERVER NAME | ~1202 |
| · PRINTER NAME (PRINTER OBJECT NAME) | ~1203 |
| · NETWORK SHARING NAME | ~1204 |
| · PORT INFORMATION | ~1205 |
| · PRINTER DRIVER NAME | ~1206 |
| · COMMENT | ~1207 |
| · PRINTER SETTING INFORMATION | ~1208 |
| · SEPARATING PAGE FILE NAME | ~1209 |
| · PRINT PROCESSOR NAME | ~1210 |
| · SPOOL DATA NAME | ~1211 |
| · PRINTER PARAMETERS | ~1212 |
| · PRINTER SECURITY INFORMATION | ~1213 |
| · PRINT JOB PRIORITY ORDER INFORMATION | ~1214 |
| · STANDARD JOB PRIORITY ORDER INFORMATION | ~1215 |
| · PRINTING ENABLE START SET TIME | ~1216 |
| · PRINTING ENABLE END SET TIME | ~1217 |
| · PRINTER STATUS INFORMATION | ~1218 |
| · NUMBER OF JOBS HELD BY PRINTER | ~1219 |
| · AVERAGE PRINTING TIME INFORMATION | ~1220 |

FIG. 6

```
typedef struct_DEVMODE{  char dmDeviceName[CCHDEVICENAME];  ~1221
                         UNIT dmSpecVersion;                ~1222
                         UNIT dmDriverVersion;              ~1223
                         UNIT dmSize;                       ~1224
                         UNIT dmDriverExtra;                ~1225
                         DWORD dmFields;                    ~1226
                         int dmOrientation;                 ~1227
                         int dmPaperSize;                   ~1228
                         int dmPaperLength;                 ~1229
                         int dmPaperWidth;                  ~1230
                         int dmScale;                       ~1231
                         int dmCopies;                      ~1232
                         int dmDefaultSource;               ~1233
                         int dmPrintQuality;                ~1234
                         int dmColor;                       ~1235
                         int dmDuplex;                      ~1236
                         int dmYResolution;                 ~1237
                         int dmTTOption;                    ~1238
                         int dmCollate;                     ~1239
                         TCHAR dmFormName[CCHFORMNAME];     ~1240
                         WORD dmLogPixels;                  ~1241
                         DWORD dmBitsPerPel;                ~1242
                         DWORD dmPelsWidth;                 ~1243
                         DWORD dmPelsHeight;                ~1244
                         DWORD dmDisplayFlags;              ~1245
                         DWORD dmDisplayFrequency;          ~1246
                         DWORD dmICMMethod;                 ~1247
                         DWORD dmICMIntent;                 ~1248
                         WORD dmMediaType;                  ~1249
                         DWORD dmDitherType;                ~1250
                         DWORD dmReserved1;                 ~1251
                         DWORD dmReserved2;                 ~1252
                      }DEVMODE;
```

FIG. 15
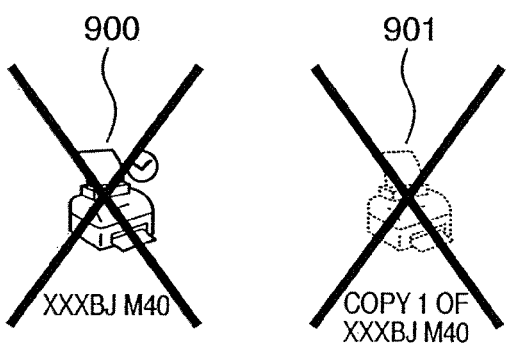
XXXBJ M40     COPY 1 OF XXXBJ M40
XXXBJ M40

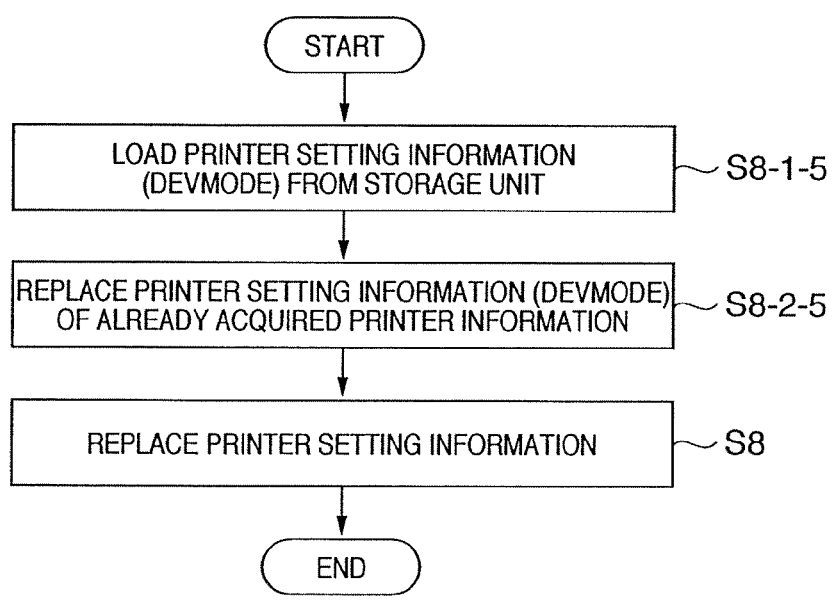
F I G. 17

INFORMATION PROCESSING APPARATUS, METHOD OF CONTROLLING THE SAME, PROGRAM, AND RECORDING MEDIUM

CROSS-REFERENCE TO RELATED APPLICATIONS

The present application is a division of application Ser. No. 10/742,834, filed Dec. 23, 2003, the entire disclosure of which is hereby incorporated herein by reference.

FIELD OF THE INVENTION

The present invention relates to an information processing apparatus for controlling management of a device object as management information for managing a device, a method of controlling the apparatus, a program, and a recording medium.

BACKGROUND OF THE INVENTION

An operating system (to be referred to as an OS hereinafter) of a computer has a concept called Plug and Play. Plug and Play is a mechanism which makes hardware or an external device usable only by connecting the hardware or external device to a computer main body.

For example, a USB device (a device (e.g., a printer or scanner) having a USB interface) corresponding to the standard of Plug and Play transmits, to the OS of a computer, unique identification information such as a hardware identifier (hardware ID) or USB identifier (USB ID) for specifying the USB device. On the basis of this unique identification information, the OS installs or sets a device driver or device setting information of the USB device in order to manage the USB device and make it usable.

A USB printer is a preferred example of the USB device. When this USB printer which has not been connected before is connected, Windows (registered trademark) which is an OS of Microsoft, U.S.A. expresses a hardware ID obtained by Plug and Play by a name (to be referred to as a printer name hereinafter) readily understandable by a user, and forms a printer object having this printer name on a graphical user interface provided by the OS.

If a printer whose printer object is already formed is connected again, the OS validates the corresponding printer object. In this case, the user selects the validated printer object when using the printer.

Assume that a USB printer having the same hardware ID as a printer whose printer driver is already installed is connected, i.e., a USB printer of the same type but has never been connected is connected. In this case, the OS compares the two USB IDs, and determines that this printer is another printer having the same hardware ID as that of the connected printer. As a consequence, the OS forms a new printer object on the basis of the already installed printer object, and manages the connected printer by assigning it the formed printer object.

In the Windows environment having the Plug and Play function as described above, when a printer of the same type but having a different USB ID is newly connected to a computer, a new printer object is formed on the basis of a printer object of an already installed printer of the same type.

Unfortunately, this method is sometimes inconvenient for a user who owns and uses a plurality of printers of the same type having the same hardware ID.

That is, even when a user has a plurality of printers of the same type, if he or she intends to alternately use them, he or she may want to use the same printer setting information or the same printer object.

For example, when ten salespersons use five mobile printers, each salesperson does not use the same printer; he or she brings an arbitrary unused mobile printer to a customer or the like on a day he or she wants to use the printer, and prints proposal data or the like by connecting the printer to his or her own personal computer.

As described above, if printer objects equal in number to printers exist, a user must switch these printer objects and must individually set the printing conditions. That is, in the above example, each salesperson's notebook personal computer contains a maximum of five printer objects, so he or she must take some time to switch these printer objects by checking the actually connected mobile printer when printing data or the like.

Also, if a printer goes out of order and its substitute must be used, a new printer object corresponding to this substitute is formed, when the substitute is connected, in addition to a printer object corresponding to the faulty printer.

Unfortunately, when this formed printer object of the substitute is displayed, it is not distinguished from that of the faulty machine. Therefore, the user cannot easily identify the printer object of the substitute. In addition, although the two printers are of the same type, the user must take some time to perform initial settings such as printer settings again.

SUMMARY OF THE INVENTION

The present invention has been made to solve the above problems, and has as its object to provide an information processing apparatus capable of efficiently switching and setting device objects, a method of controlling the apparatus, a program, and a recording medium.

According to the present invention, the foregoing object is attained by providing an information processing apparatus for controlling management of a device object which is management information for managing a device, comprising:

acquirer for acquiring device information concerning a device of the device object;

deleter for deleting an existing device object if at least a portion of device information concerning a device of the existing device object matches at least a portion of device information concerning a device of a new device object; and updater for updating the device information concerning the device of the new device object by using the device information concerning the device of the existing device object.

According to the present invention, the foregoing object is attained by providing an information processing apparatus for controlling management of a device object which is management information for managing a device, comprising:

acquirer for acquiring device information concerning a device of the device object;

deleter for deleting a new device object if at least a portion of device information concerning a device of an existing device object matches at least a portion of device information concerning a device of the new device object; and updater for updating the device information concerning the device of the existing device object by using the device information concerning the device of the new device object.

According to the present invention, the foregoing object is attained by providing an information processing apparatus for controlling management of a device object which is management information for managing a device, comprising:

acquirer for acquiring device information concerning a device of the device object;

deleter for deleting an existing device object and new device object if at least a portion of device information concerning a device of the existing device object matches at least a portion of device information concerning a device of the new device object; and generater for generating a device object by using the device information concerning the devices of the existing device object and new device object.

According to the present invention, the foregoing object is attained by providing an information processing apparatus for controlling management of a device object which is management information for managing a device, comprising:

deleter for deleting an existing device object if at least a portion of device information concerning a device of the existing device object matches at least a portion of device information concerning a device of a new device object; and updater for updating the device information concerning the device of the new device object by using predetermined device information.

In a proffered embodiment, the device object has information for managing an icon image corresponding to the device object.

In a proffered embodiment, the device information contains not less than one of a device object name, device driver name, device setting information, and port information.

In a proffered embodiment, the device information updated by the updater contains one or both of the device object name and device setting information contained in the device information concerning the device of the existing device object acquired by the acquirer.

In a proffered embodiment, the device information updated by the updater contains the port information contained in the device information concerning the device of the new device object acquired by the acquirer.

In a proffered embodiment, the device information used by the generater contains the device driver name, device object name, and device setting information contained in the device information concerning the device of the existing device object acquired by the acquirer, and the port information contained in the device information concerning the device of the new device object acquired by the acquirer.

In a proffered embodiment, the predetermined device information is device information set by a user and prestored in a storage unit.

In a proffered embodiment, further comprising designater for designating a device to be processed, wherein update or generation by the updater or generater is performed if at least a portion of device information concerning a device of an existing device object of a device designated by the designater matches at least a portion of device information concerning a device of a new device object.

In a proffered embodiment, further comprising setter for setting, as a default device object, a device object updated or generated by the updater or generater.

In a proffered embodiment, further comprising controller for controlling management of the device object on the basis of a connection state of the existing device object.

In a proffered embodiment, further comprising controller for controlling management of the device object on the basis of port information contained in the existing device object.

In a proffered embodiment, further comprising indicator for indicating whether control by the controller can be executed.

In a proffered embodiment, further comprising controller for controlling at least one of the deleter, updater, and generater with an access right of a System Manager level for controlling the device object.

In a proffered embodiment, the device is a peripheral device, and the device object includes information related to an icon indicating the peripheral device.

In a proffered embodiment, the device is a peripheral device, and the device object includes setting information for a device driver program of the peripheral device.

According to the present invention, the foregoing object is attained by providing an information processing apparatus for controlling a process of displaying, on a display unit, device icon managed in one-to-one correspondence with a device, comprising:

acquirer for acquiring device information of the device when the device is connected to the information processing apparatus via a communication medium; and display controller for controlling the process of displaying the device icon on the display unit by using the device information acquired by the acquirer, wherein if at least a portion of device information already stored in the information processing apparatus matches at least a portion of the device information acquired by the acquirer, the display controller controls the display process so as not to newly display the device object.

According to the present invention, the foregoing object is attained by providing a method of controlling an information processing apparatus for controlling management of a device object which is management information for managing a device, comprising:

an acquiring step of acquiring device information concerning a device of the device object;

a deleting step of deleting an existing device object if at least a portion of device information concerning a device of the existing device object matches at least a portion of device information concerning a device of a new device object; and an updating step of updating the device information concerning the device of the new device object by using the device information concerning the device of the existing device object.

According to the present invention, the foregoing object is attained by providing a method of controlling an information processing apparatus for controlling management of a device object which is management information for managing a device, comprising:

an acquiring step of acquiring device information concerning a device of the device object;

a deleting step of deleting a new device object if at least a portion of device information concerning a device of an existing device object matches at least a portion of device information concerning a device of the new device object; and an updating step of updating the device information concerning the device of the existing device object by using the device information concerning the device of the new device object.

According to the present invention, the foregoing object is attained by providing a method of controlling an information processing apparatus for controlling management of a device object which is management information for managing a device, comprising:

an acquiring step of acquiring device information concerning a device of the device object;

a deleting step of deleting an existing device object and new device object if at least a portion of device information concerning a device of the existing device object matches at least a portion of device information concerning a device of the new device object; and a generating step of generating a device object by using the device information concerning the devices of the existing device object and new device object.

According to the present invention, the foregoing object is attained by providing a method of controlling an information processing apparatus for controlling management of a device object which is management information for managing a device, comprising:

an acquiring step of acquiring device information concerning a device of the device object;

a deleting step of deleting an existing device object if at least a portion of device information concerning a device of the existing device object matches at least a portion of device information concerning a device of a new device object; and an updating step of updating the device information concerning the device of the new device object by using predetermined device information.

According to the present invention, the foregoing object is attained by providing a method of controlling an information processing apparatus for controlling a process of displaying, on a display unit, device icon managed in one-to-one correspondence with a device, comprising:

an acquiring step of acquiring device information of the device when the device is connected to the information processing apparatus via a communication medium; and a display control step of controlling the process of displaying the device icon on the display unit by using the device information acquired in the acquiring step, wherein if at least a portion of device information already stored in the information processing apparatus matches at least a portion of the device information acquired in the acquiring step, the display control step controls the display process so as not to newly display the device object.

In a preferred embodiment, the device is a peripheral device, and the device object includes information related to an icon indicating the peripheral device.

In a preferred embodiment, the device is a peripheral device, and the device object includes setting information for a device driver program of the peripheral device.

According to the present invention, the foregoing object is attained by providing a program for implementing control of an information processing apparatus for controlling management of a device object which is management information for managing a device, comprising:

a program code for an acquiring step of acquiring device information concerning a device of the device object;

a program code for a deleting step of deleting an existing device object if at least a portion of device information concerning a device of the existing device object matches at least a portion of device information concerning a device of a new device object; and a program code for an updating step of updating the device information concerning the device of the new device object by using the device information concerning the device of the existing device object.

According to the present invention, the foregoing object is attained by providing a program for implementing control of an information processing apparatus for controlling management of a device object which is management information for managing a device, comprising:

a program code for an acquiring step of acquiring device information concerning a device of the device object;

a program code for a deleting step of deleting a new device object if at least a portion of device information concerning a device of an existing device object matches at least a portion of device information concerning a device of the new device object; and a program code for an updating step of updating the device information concerning the device of the existing device object by using the device information concerning the device of the new device object.

According to the present invention, the foregoing object is attained by providing a program for implementing control of an information processing apparatus for controlling management of a device object which is management information for managing a device, comprising:

a program code for an acquiring step of acquiring device information concerning a device of the device object;

a program code for a deleting step of deleting an existing device object and new device object if at least a portion of device information concerning a device of the existing device object matches at least a portion of device information concerning a device of the new device object; and a program code for a generating step of generating a device object by using the device information concerning the devices of the existing device object and new device object.

According to the present invention, the foregoing object is attained by providing a program for implementing control of an information processing apparatus for controlling management of a device object which is management information for managing a device, comprising:

a program code for an acquiring step of acquiring device information concerning a device of the device object;

a program code for a deleting step of deleting an existing device object if at least a portion of device information concerning a device of the existing device object matches at least a portion of device information concerning a device of a new device object; and a program code for an updating step of updating the device information concerning the device of the new device object by using predetermined device information.

According to the present invention, the foregoing object is attained by providing a program for implementing control of an information processing apparatus for controlling a process of displaying, on a display unit, device icon managed in one-to-one correspondence with a device, comprising:

a program code for an acquiring step of acquiring device information of the device when the device is connected to the information processing apparatus via a communication medium; and a program code for a display control step of controlling the process of displaying the device icon on the display unit by using the device information acquired in the acquiring step, wherein if at least a portion of device information already stored in the information processing apparatus matches at least a portion of the device information acquired in the acquiring step, the display control step controls the display process so as not to display the existing device object.

According to the present invention, the foregoing object is attained by providing a computer readable recording medium recording the program cited in the above any one of the programs.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a view showing an example of printer information of the embodiment of the present invention;

FIG. 6 is a view showing the definition of the structure of printer setting information of the embodiment of the present invention;

FIG. 15 is a view showing the transition of the display state of printer objects in a printer object management window of the embodiment shown in FIG. 14;

FIG. 17 is a flow chart showing details of a printer object control process of a modification of the embodiment shown in FIG. 10;

DETAILED DESCRIPTION OF THE PREFERRED EMBODIMENTS

Preferred embodiments of the present invention will now be described in detail in accordance with the accompanying drawings.

Figure 1:
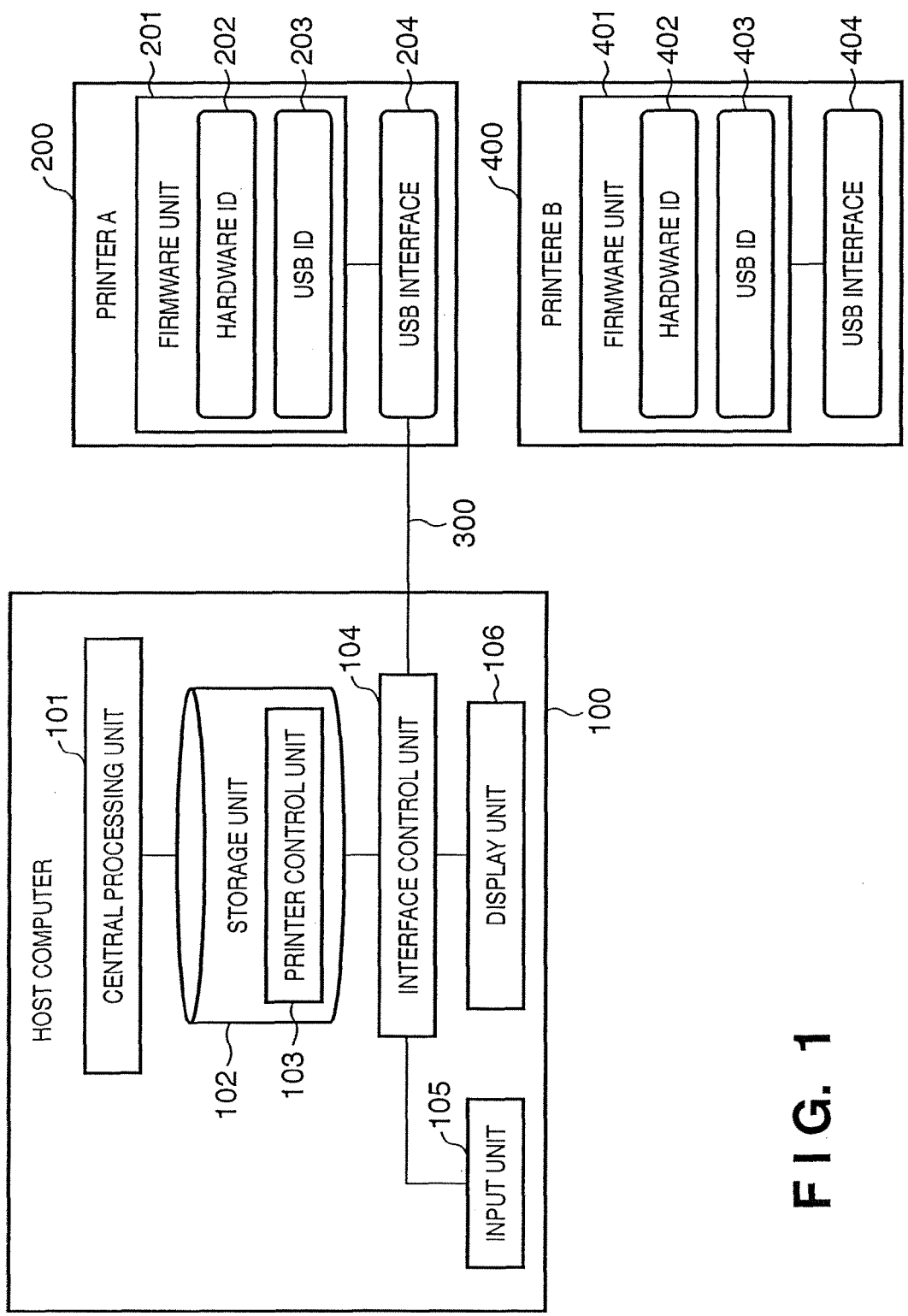
FIG. 1 is a block diagram showing the arrangement of a printer control system of an embodiment of the present invention.

FIG. 1 is a block diagram showing the functional configuration of a printer control system of the most preferred embodiment of the present invention.

This printer control system comprises a host computer 100 and printer A 200. A printer B 400 is of the same type as the printer A 200. The host computer 100 and printer A 200 are connected by a USB cable 300, and the printers A 200 and B 400 are alternately connected.

This embodiment will be explained by taking a case in which the printers A 200 and B 400 are alternately connected as an example. However, the present invention is also applicable to a case in which three or more printers of the same type are appropriately switched.

The host computer 100 includes a central processing unit 101 for controlling the entire operation of the host computer 100, a storage unit 102, a printer control unit 103, an interface control unit 104, an input unit 105, and a display unit 106.

The printer control unit 103 is implemented by an OS or utility tool (software), and stored in the storage unit 102 which is a storage medium such as a hard disk or CD-ROM.

The host computer 100 has standard components (e.g., a CPU, RAM, ROM, hard disk, external storage, network interface, display, keyboard, and mouse) of a general-purpose computer represented by a personal computer. The host computer 100 is implemented by these components.

Examples of the components of the host computer 100 will be explained below with reference to FIG. 2.

Figure 2:
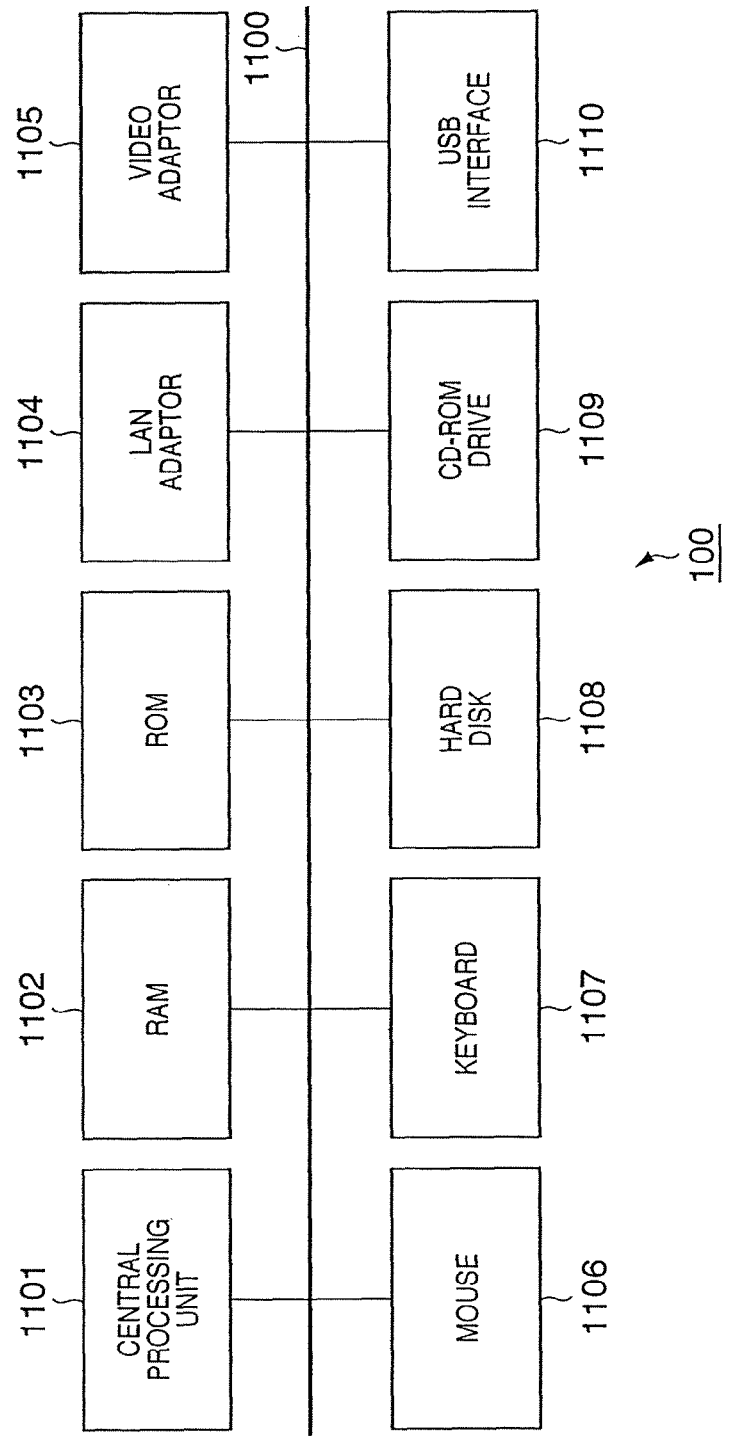
FIG. 2 is a block diagram showing constituent elements of a host computer of the embodiment of the present invention.

FIG. 2 is a block diagram showing the components of the host computer of the most preferred embodiment of the present invention.

Referring to FIG. 2, the host computer 100 has, as hardware components, a central processing unit (CPU) 1101, RAM 1102, ROM 1103, LAN adaptor 1104, video adaptor 1105, mouse 1106, keyboard 1107, hard disk 1108, CD-ROM drive 1109, USB interface 1110, and the like. These components are connected to each other via a system bus 1100.

The system bus 1100 means a PCI bus, AGP bus, memory bus, and the like. In FIG. 2, chips for connecting these buses, a keyboard interface, and I/O interfaces such as so-called SCSI and ATAPI are omitted.

The central processing unit 1101 implements the central processing unit 101 shown in FIG. 1. The RAM 1102, ROM 1103, hard disk 1108, and CD-ROM drive 1109 implement the storage unit 102 shown in FIG. 1. The LAN adaptor 1104, video adaptor 1105, and USB interface 1110 implement the interface control unit 104 shown in FIG. 1. The mouse 1106 and keyboard 1107 implement the input unit 105 shown in FIG. 1.

The central processing unit 1101 performs various arithmetic operations such as four arithmetic operations and comparative operations and controls the hardware on the basis of programs of the operating system and application programs. The RAM 102 temporarily stores the operating system programs and application programs read out from the hard disk 1108 or from a storage medium such as a CD-ROM or CD-R loaded in the CD-ROM drive 1109. These programs are executed under the control of the central processing unit 1101.

The ROM 1103 stores, e.g., so-called BIOS which controls input and output to and from the hard disk 1108 and the like in cooperation with the operating system. The LAN adaptor 1104 communicates with external apparatuses across a network in cooperation with a communication program of the operating system controlled by the central processing unit 1101.

The video adaptor 1105 generates an image signal to be output to the display device. The keyboard 1107 and mouse 1106 are used to input instructions to the information processing apparatus. The hard disk 1108 stores various programs such as the operating system, application programs, and a utility tool for implementing the printer control unit 103 shown in FIG. 1.

The CD-ROM drive 1109 is used to install application programs into the hard disk 1106 by loading a storage medium such as a CD-ROM, CD-R, or CD-R/W in the CD-ROM drive 1109. It is of course also possible to use various disk drives such as a CD-R drive, CD-R/W drive, and MO drive, instead of the CD-ROM drive 1109.

FIG. 1 will be explained again.

The printer A 200 includes a firmware unit 201 and manages two identifiers, i.e., a hardware ID 202 and USB ID 203. The hardware ID 202 is an identifier for identifying the type of the printer A 200. The USB ID 203 is a unique value for identifying a USB interface 204 of the printer S200.

The printer B 400 is of the same type as the printer A 200; the printer B 400 includes a firmware unit 401 and manages two identifiers, i.e., a hardware ID 402 and USB ID 403. The printer B 400 also includes a USB interface 404. Since the printer B 400 is of the same type as the printer A 200, the hardware ID 202 of the printer A 200 and the hardware ID 402 of the printer B 400 are identical. In contrast, the USB ID 203 and USB ID 403 for identifying the USB interfaces of these printers are different.

As the printing system of the printers A 200 and B 400, it is possible to use various printing systems such as an inkjet system, laser beam system, and thermal transfer system. Each of the printers A 200 and B 400 has a printer engine, controller, and recording unit for implementing a printing system to be used.

The hardware configuration of the printers A 200 and B 400 will be described below with reference to FIG. 3.

Figure 3:
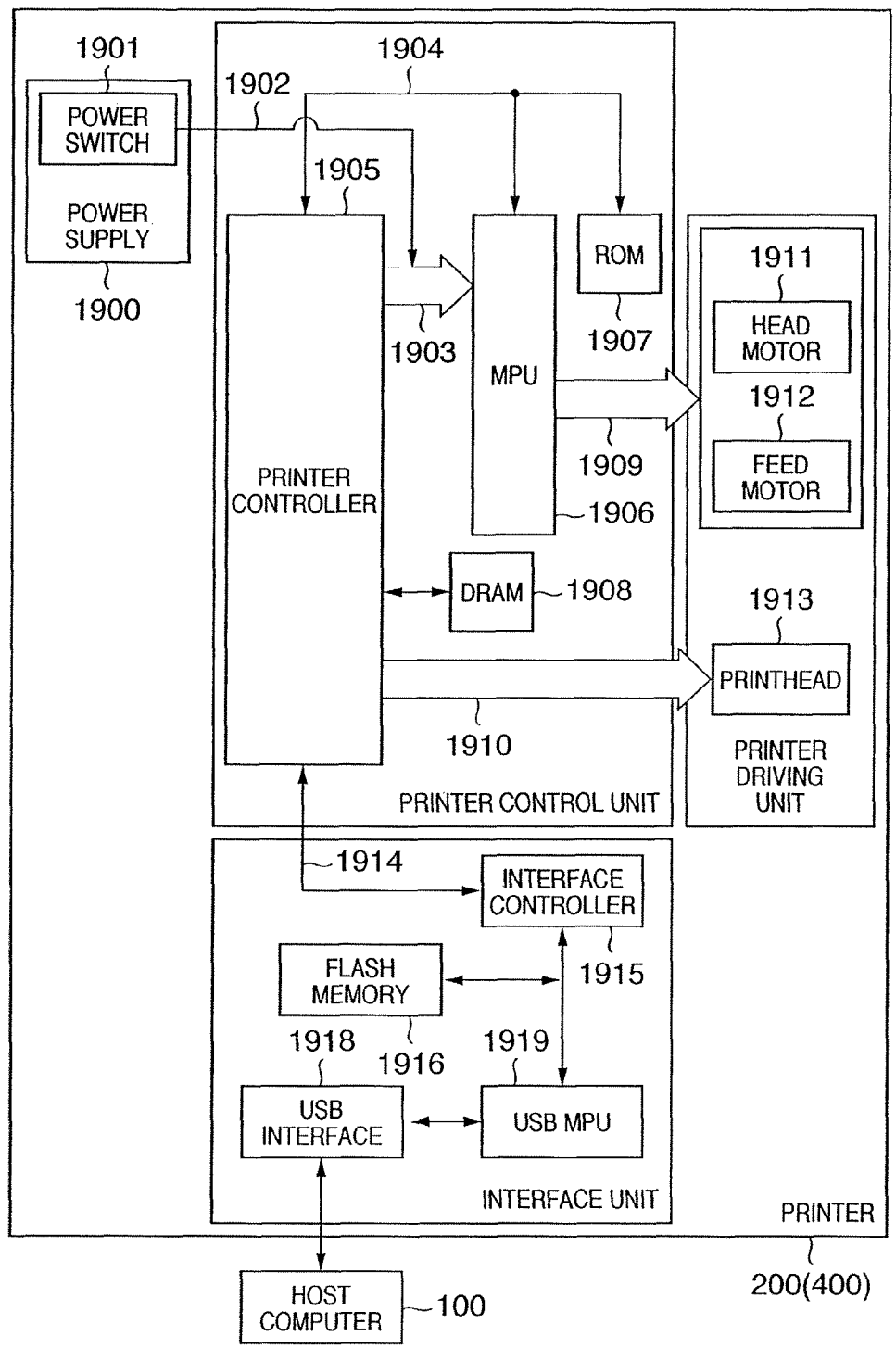
FIG. 3 is a block diagram showing the hardware configuration of a printer of the embodiment of the present invention.

FIG. 3 is a block diagram showing the hardware configuration of the printer of the most preferred embodiment of the present invention.

In FIG. 3, reference numeral 1900 denotes a power supply of the printer; 1901, a power switch for turning on and off the power supply; and 1902, a signal line for transmitting, to an MPU 1906, an operation signal indicating the contents of the operation of the power switch 1901. Since this operation signal is transmitted to the MPU 1906 as an interrupt signal to a signal 1903, the MPU 1905 preferentially processes the signal. Reference numeral 1904 denotes a data bus for connecting a printer controller 1905, the MPU 1906, and a ROM 1907.

The ROM 1907 stores programs describing operations and processes of the MPU 1906. This program is generally called firmware, and equivalent to the firmware unit 201 or 401 of the printer A 200 or B 400, respectively, shown in FIG. 1. The ROM 1907 stores the hardware ID 203 of the printer A 200 or the hardware ID 403 of the printer B 400.

The printer controller 1905 has a function of controlling the operations of various memories (e.g., the ROM 1907 and a DRAM 1908), printer driving unit, interface unit, and the like in the printer. The DRAM 1908 is a RAM which provides a storage area for temporarily storing data and the like when the MPU 1906 performs processing.

Reference numeral 1909 denotes a signal line for transmitting signals for controlling a head motor 1911 and feed motor 1912 in the printer driving unit. The head motor 1911 is a motor for operating, e.g., a printhead 1913 which prints data on a printing medium by discharging ink. The feed motor 1912 is a motor for feeding or discharging a printing medium set in the printer, and conveying the printing medium when the printhead 1913 performs printing. Reference numeral 1910 denotes a control line for controlling the operation of the printhead 1913.

Reference numeral 1914 denotes a data bus used to exchange data between an interface controller 1915 in the interface unit and the printer controller 1905. For example, data received from the host computer 100 is transferred from the interface controller 1915 to the printer controller via the data bus 1914.

Reference numeral 1918 denotes a USB interface equivalent to the USB interface 204 of the printer A 200 or the USB interface 404 of the printer B 400.

Reference numeral 1916 denotes a flash memory storing programs by which an MPU 1919 controls the USB interface 1918. The flash memory 1916 also stores the USB ID 203 of the printer A 200 or the USB ID 403 of the printer B 400.

Reference numeral 1917 denotes a signal line for connecting the interface controller 1915 to the flash memory 1916 and USB MPU 1919.

The arrangement of the printer control unit 103 will be described in detail below with reference to FIG. 4.

Figure 4:
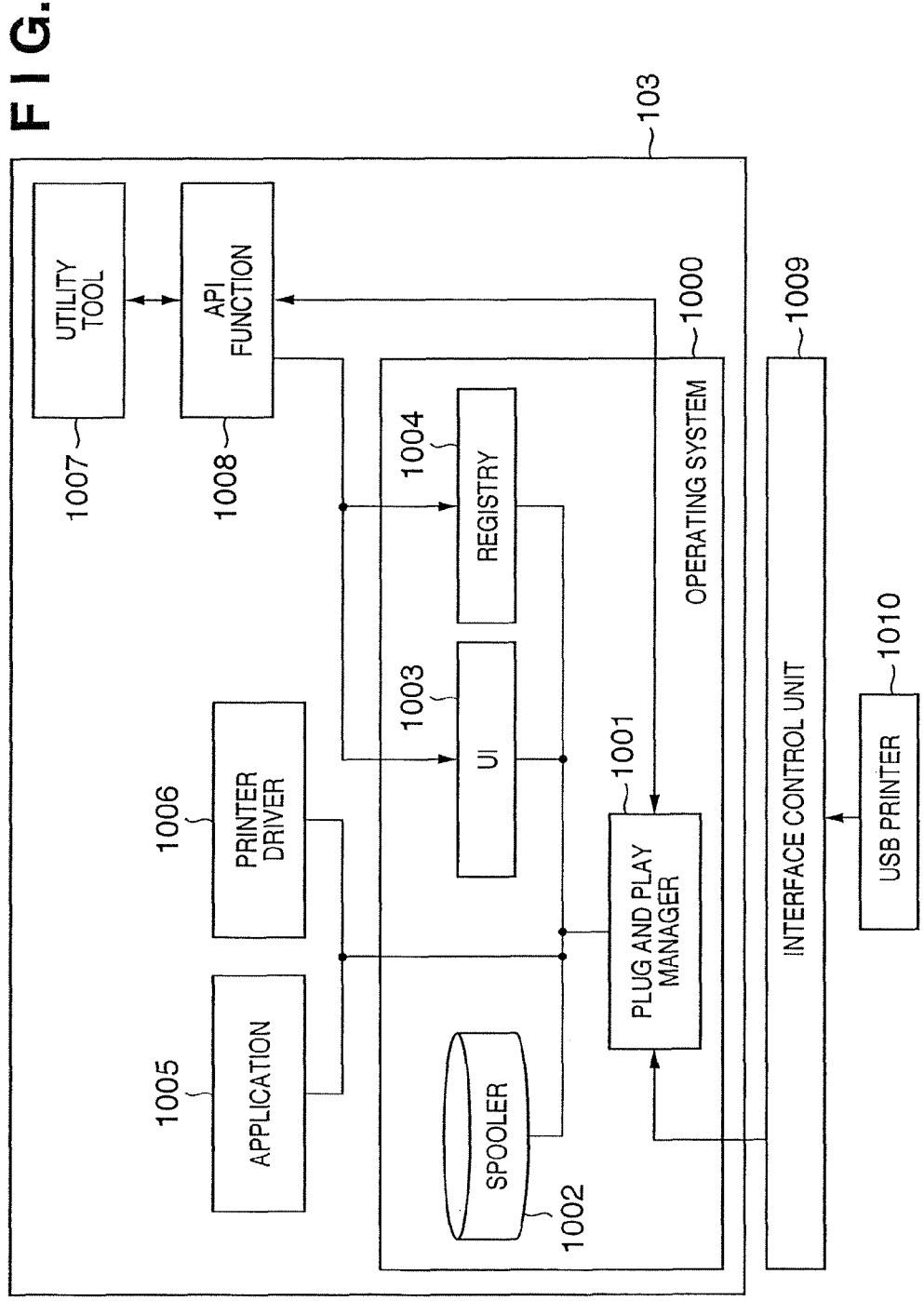
FIG. 4 is a block diagram showing details of the arrangement of a printer control unit of the embodiment of the present invention.

FIG. 4 is a block diagram showing details of the arrangement of the printer control unit of the most preferred embodiment of the present invention.

The printer control unit 103 comprises an operating system 1000, and an application 1005, printer driver 1006, and utility tool 1007 running on the operating system 1000.

The operating system 1000 includes a Plug and Play manager 1001 for realizing Plug and Play, a spooler 1002 for managing print requests, a user interface (UI) 1003, and a registry 1004 which is a database for managing various pieces of information such as settings of device drivers and settings of applications.

An interface control unit 1009 is equivalent to the interface control unit 104 shown in FIG. 1. A USB printer 1010 corresponds to the printer A 200 or B 400 shown in FIG. 1.

When the USB printer 1010 is connected, a USB interface as part of the interface control unit 1009 acquires printer information concerning the printer, which includes the hardware ID and USB ID of the connected printer, and transfers the acquired printer information to the Plug and Play manager 1001.

When this printer information is acquired, temporary information obtained from the printer information is stored in the storage unit such as the RAM 1102 shown in FIG. 2 and used by various programs such as the operating system 1000. The acquired temporary information contains information other than the two pieces of information described above. The remaining information will be described later with reference to FIG. 5.

The Plug and Play manager 1001 thus recognizes the connected hardware.

The spooler 1002 is a mechanism which temporarily stores print jobs from the USB printer 1010, and sequentially executes printing processes. The process of the spooler 1002 is performed for each printer port, and the spooler 1002 is a mechanism provided by the operating system 1000. Port information related to the spooler 1002 is contained in the printer information acquired by the Plug and Play manager 1001 when the USB printer 1010 is connected. The Plug and Play manager 1001 performs a process of relating the printer port name to the spooler.

The UI 1003 is a user interface displayed on the display unit by the operating system 1000. After recognizing the connected USB printer 1010, the Plug and Play manager 1001 performs a printer object addition process on the UI 1003. This process will be explained in detail later.

Examples of the printer information to be registered in the registry 1004 will be explained below with reference to FIG. 5.

FIG. 5 is a view showing examples of the printer information of the most preferred embodiment of the present invention.

Printer information 1201 is made up of a plurality of different pieces of information. The contents of each information will be described below.

Reference numeral 1202 denotes a printer server name; and 1203, a printer name. The printer name 1203 is a printer object name. A network sharing name 1204 represents a printer name when the printer is shared across the network. Port information 1205 contains a port name, port number, and the like.

A printer driver name 1206 represents the name of a printer driver which is used by the printer corresponding to the printer information 1201. Reference numeral 1207 denotes a comment for the printer; and 1208, printer setting information to be described in detail later. A separating page file name 1209 designates a page file name for separation to be inserted between print jobs when the printer performs printing.

A print processor name 1210 represents the name of a print processor to be used when the printer performs a printing process. Reference numeral 1211 denotes a spool data name. A RAW data form and EMF data form are examples of a spool data form. The spool data name 1211 represents a spool data form to be used.

Printer parameters 1212 represent various parameters to be given to the printer. Printer security information 1213 represents, e.g., information of a user who is permitted to access the printer. Reference numeral 1214 denotes print job priority order information; 1215, standard job priority order information which represents priority order information of default jobs; 1216, printing enable start set time; 1217, printing enable end set time; 1218, status information indicating the status of the printer; 1219, the number of jobs held by the printer; and 1220, the average printing time of the printer.

The printer setting information (DEVMODE) 1208 is the structure of printer setting information defined by the Windows operating system. An example of the definition will be explained below with reference to FIG. 6.

FIG. 6 is a view showing the definition of the structure of the printer setting information of the most preferred embodiment of the present invention.

Reference numeral 1221 denotes a hardware ID; 1222, the version number of an operating system to be used; 1223, the version number of a printer driver; 1224, the size of the DEVMODE structure; 1225, the size of an area to be used for an expanded DEVMODE structure; and 1226, a flag indicative of a function supported by the printer driver.

Reference numeral 1227 denotes a value indicating the printing orientation; 1228, a value indicating the paper size; 1229, a value indicating the paper length; 1230, a value indicating the paper width; 1231, a value indicating the scale; 1232, a value indicating the number of copies; 1233, a value indicating the type of a default sheet; 1234, a value indicating the printing quality; 1235, a value indicating the color; and 1236, a value indicating whether to perform double-sided printing.

Reference numeral 1237 denotes a value indicating the longitudinal resolution of an image; 1238, a value when TrueType font is to be used; 1239, a value pertaining to copy-by-copy printing; 1240, a value indicating the name of a sheet form; 1241, a value indicating the logical resolution; and 1242, a value concerning the color resolution.

Reference numerals 1243 to 1246 denote values used by a display driver; 1247, a value concerning a method of designating a color profile; 1248, a value concerning a color matching method; 1249, a value indicating the type of sheet; 1250, a value indicating a dithering method; and 1251 and 1252, reserved values.

FIG. 4 will be explained again.

When recognizing the connected USB printer 1010, the Plug and Play manager 1001 notifies the application 1005 executed on the operating system 1000 that the printer is connected.

In the Windows operating system, for example, a specific message called a window message is issued to the application 1005 or utility tool 1007 which is activated. The application 1005 or utility tool 1007 which has received this message can individually recognize the addition of the printer.

Also, the Plug and Play manager 1001 loads the appropriate printer driver 1006 of the connected USB printer 1010.

The utility tool 1007 installed in the host computer 100 has a mechanism for manipulating information of the UI 1003 and registry 1004 registered by the Plug and Play manager 1001. The utility tool 1007 can manipulate the above-mentioned information by using an API (Application Program Interface) function 1008, called Win32API, of the operating system.

Plug and Play installation executed by the host computer 100 when the printer A 200 is connected to the host computer 100 will be described below.

Referring to FIG. 1, when the printer A 200 is connected to the host computer 100 by the USB cable 300, the interface control unit 104 of the host computer 100 acquires the printer information including the hardware ID 202 and USB ID 203 of the printer A 200.

As described above, this printer information is transferred to the printer control unit 103 via the interface control unit 104 by using the temporary storage area of the storage unit 104 (e.g., the registry 1004 or RAM 1102).

On the basis of the printer information acquired from the storage unit 102 and the USB ID and hardware ID acquired from the firmware unit 401 (e.g., the flash memory 1916 or ROM 1907), the Plug and Play manager 1001 of the operating system 1000 as part of the printer control unit 103 determines whether the connected printer A 200 is a newly connected printer.

On the basis of the determination result, a printer object is formed in a printer management window (FIG. 7) displayed on the display unit 106. In addition, a printer driver of the printer corresponding to this printer object is installed in the storage unit 102.

Note that a printer object to be explained in the most preferred embodiment and modifications of the most preferred embodiment is management information to be used by a printer driver which corresponds to at least one printer and which is a preferred example of the control program of the present invention. This management information may also be displayed as a printer icon by a mechanism to be explained later. The management information contains the aforementioned printer information capable of specifying, e.g., the type of printer.

In Windows, for example, the printer object is managed in the form of a database (registry 1004) called registry information. When the operating system 1000 as an example of display control means stored in the storage unit 102 reads out the registry information, it is possible to control the process of displaying the printer object as a printer icon image generated in the printer management window.

When the printer A 200 is disconnected and the printer B 400 is connected after that, the interface control unit 104 of the host computer 100 acquires the printer information including the hardware ID 402 and USB ID 403 of the printer B 400 from the firmware unit 401.

On the basis of the printer information acquired from the storage unit 102 and the USB ID and hardware ID acquired from the firmware unit 401, the Plug and Play manager 1001 of the operating system 1000 as part of the printer control unit 103 determines whether the connected printer B 400 is a newly connected printer. Since the hardware ID 402 of the printer B 400 is identical to the hardware ID 202 of the already installed printer A 200, the Plug and Play manager 1001 forms a new printer object on the basis of the printer object of the printer A 200, and displays the new printer object in the printer management window.

In practice, these processes performed by the interface control unit 104 and printer control unit 103 are realized by the central processing unit 101 by executing software. Although the program is generally installed as the OS or utility software, it may also be realized by dedicated hardware.

The embodiment will be explained by taking a case in which these processes are performed in the Windows environment as an example. However, the present invention is not limited to this arrangement.

The following processing is also possible. The utility tool 1007 controls a process of displaying, on the display unit 104 as an example of a display, a printer icon (also called a printer object in some cases) as an example of device flag information which is managed in one-to-one correspondence with a printer as a preferred example of a device.

That is, when a printer is connected to the host computer 100 via the USB interface 300 as an example of a communication medium, the utility tool 1007 acquires the printer information as an example of device identification information of a device via the USB interface 300 and operating system 1000.

The utility tool 1007 then controls a process of registering the acquired printer information in the registry 1004 via the operating system 1000. The operating system 1000 displays the printer icon registered in the registry 1004 on the display unit 104. That is, the utility tool 1007 controls the process of displaying the printer icon on the display unit 104.

In addition, if the printer information already registered in the registry 1004 matches the printer information acquired from the newly connected printer, the utility tool 1007 does not register any new printer object in the registry 1004.

That is, if the existing printer information matches the newly acquired printer, the utility tool 1007 controls a display process so as not to display the existing printer object as a new printer object. In this case, the existing printer object and the settings related to it are used for the newly connected printer. This will be apparent from the description of remaining parts of the most preferred embodiment.

Also, the printer information is made up of identification information for identifying a printer, such as the hardware ID and USB ID acquired from the printer, and information generated (registered) by the operating system 1000 on the basis of the acquired identification information.

Furthermore, the identification information may also be acquired as it is returned by the printer in response to inquiry from the operating system 1000 or utility tool 1007, or acquired by the operating system 1000 on the basis of a message periodically sent from the printer.

The arrangement of the graphical user interface (printer management window) displayed on the display unit 106 will be described below.

Figure 7:
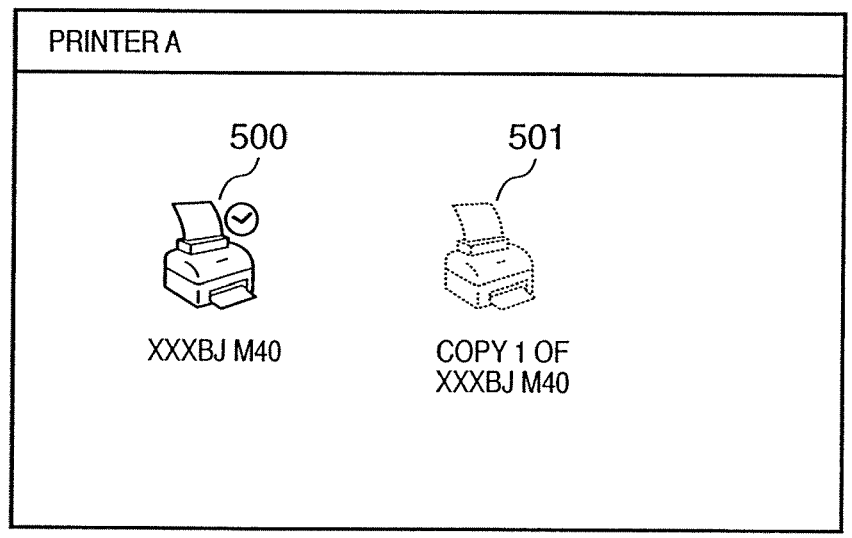
FIG. 7 is a view showing an example of a printer management window of the embodiment of the present invention.

FIG. 7 is a view showing an example of the printer management window of the most preferred embodiment of the present invention.

FIG. 7 shows the state immediately after a printer object of the printer B 400 is newly generated while a printer object of the printer A 200 is present.

In FIG. 7, reference numeral 500 denotes the printer object of the installed printer A 200; and 501, the printer object of the printer B 400, which is formed on the basis of the printer object of the printer A 200.

The arrangement of the printer information of the printer will be explained below with reference to FIG. 8.

Figure 8:
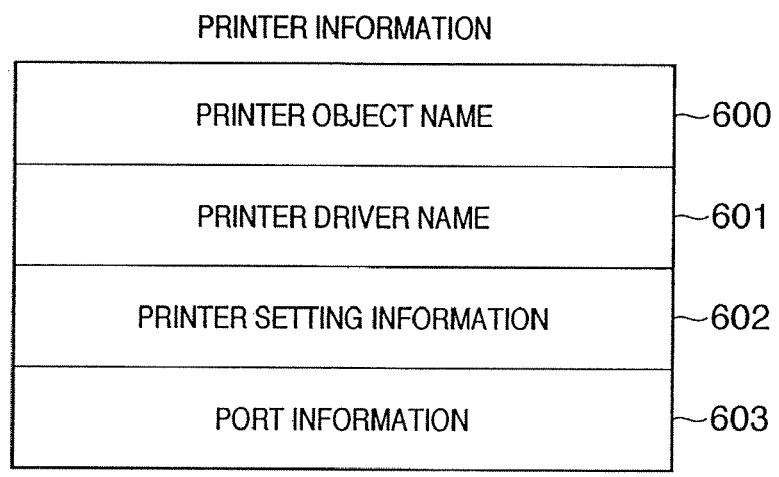
FIG. 8 is a view showing the arrangement of printer information of the embodiment of the present invention.

FIG. 8 is a view showing the arrangement of the printer information of the most preferred embodiment of the present invention.

FIG. 8 shows an example of the printer information by which the host computer 100 controls the two printer objects shown in FIG. 7. The printer objects containing this printer information are stored in, e.g., the storage unit 102.

In practice, a plurality of different pieces of information as shown in FIG. 5 described earlier are used as the printer information. However, FIG. 8 shows only information particularly related to the present invention.

Referring to FIG. 8, a printer object name 600 is the name, which is readily understandable by a user, of the hardware ID acquired by Plug and Play from the ROM 1907 by the Plug and Play manager 1001 of the operating system 1000 as part of the printer control unit 103. A printer driver name 601 is the name of a printer driver for controlling printing of a printer of this type.

Printer setting information 602 contains, e.g., the printing settings and printing conditions of the printer. Each printer object can have unique printer setting information. Port information 603 concerns a printer port related to the USB ID.

The arrangement of the printer information is an example, so any information pertaining to the printer can be used as the printer information.

In this embodiment, the completion of the Plug and Play installation as described above is detected, and the utility tool 1007 included in the printer control unit 103 stored in the storage unit 102 executes the following printer object control process in order to control the printer.

The object control process of this embodiment is executed by the utility tool 1007 of the printer control unit 103 described above. However, the process may also be controlled as a function of the operating system 1000.

Figure 9:
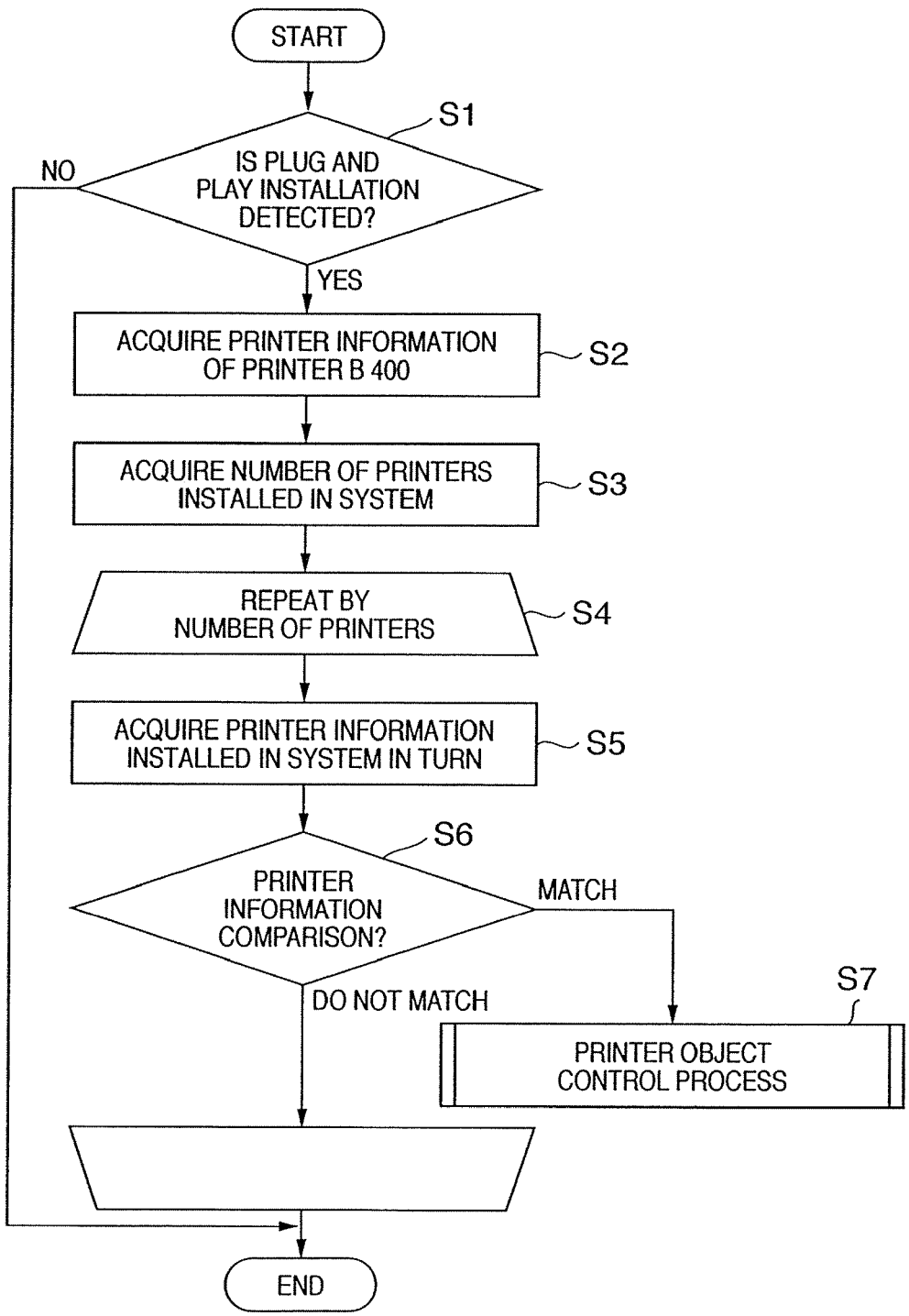
FIG. 9 is a flow chart showing an outline of the flow of a printer object control process of the most preferred embodiment of the present invention.

FIG. 9 is a flow chart showing an outline of the flow of the printer object control process of the most preferred embodiment of the present invention.

FIG. 9 will be explained by taking, as an example, an operation in which the process is executed at the detection timing of the completion of the Plug and Play installation of the printer B 400 while the printer A 200 is already installed. However, the process execution timing is not limited to this timing. For example, the process may also be executed by a user's instruction from the input unit 105.

First, in step S1, the presence/absence of Plug and Play installation is detected. This detection is done by receiving a message issued by the operating system 1000 when Plug and Play installation is complete.

This message can be received by, e.g., the API function 1008. Win32API as an example of the API function 1008 belongs to this message. In the Windows operating system, WM_DEVMODECHANGE, WM_DEVICECHANGE, and WM_WININICHANGE are examples.

If no Plug and Play installation is detected (NO in step S1), the process is terminated. If Plug and Play installation is detected (YES in step S1), Plug and Play installation for the device (printer B 400) to be processed is executed. After that, the flow advances to step S2.

In this embodiment, the process is terminated if NO in step S1. However, it is also possible to stand by and periodically receive a message.

In step S2, the printer information of the newly installed printer B 400 is acquired. In this embodiment, this printer information is acquired by the API function 1008.

The printer information can be acquired from information stored in the registry shown in FIG. 5 via the API function 1008. It is also possible to acquire printer information equal to the information shown in FIG. 5 stored in the storage unit 102.

That is, the source and procedure of acquisition are not limited as long as necessary information can be acquired from the information explained with reference to FIG. 5. In the Windows operating system, DocumentProperties( ), GetPrinter( ), and SHGetValue( ) are examples of the function of acquiring the printer information.

In step S3, the number of already installed printers other than the printer B 400 is acquired. In this embodiment, an already installed printer is the printer A 200, so its printer information is acquired by the API function 1008. In the Windows operating system, EnumPrinters( ) is an example of the function of acquiring the number of printers.

In step S4, processes in step S5 and S6 are repeated by the same number of times as the number of printers acquired in step S3.

In step S5, printer information already installed in the system and not including the printer B 400 is acquired in turn. This printer information is acquired from the storage unit 102 (e.g., the registry 1004 or RAM 1102).

In step S6, the printer information of the printer (printer A 200) acquired in step S5 is compared with the printer information of the printer B 400. In this embodiment, the printer driver names 601 are compared to determine whether a printer of the same type as the newly installed printer is already installed.

Especially in Windows, when a new printer object is to be formed on the basis of an already installed printer object, the formed printer object is assigned the same printer driver as the already installed printer object. Accordingly, the same type of printers have the same printer driver name 601.

If there is no printer matching the newly installed printer, therefore, the process is immediately terminated. If there is a printer matching the newly installed printer, a printer object control process in step S7 is executed.

In this embodiment, a printer meeting the condition in step S6 is the printer A 200.

The printer object control process in step S7 will be described in detail below with reference to FIG. 10.

Figure 10:
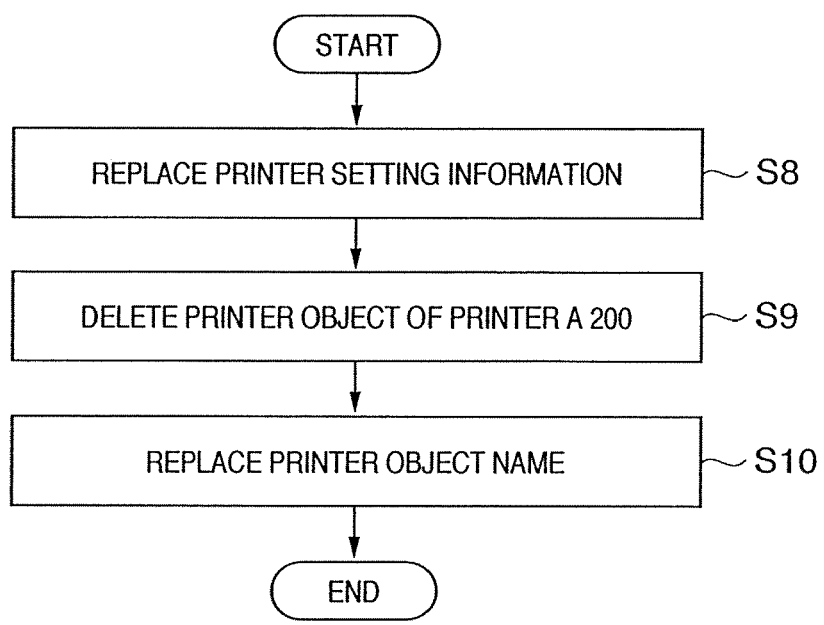
FIG. 10 is a flow chart showing details of the printer object control process of the most preferred embodiment of the present invention.

FIG. 10 is a flow chart showing details of the printer object control process of the most preferred embodiment of the present invention.

First, in step S8, the printer setting information of the printer B 400 is replaced with the printer setting information of the already installed printer A 200 via the API function 1008.

In the Windows operating system, SetPrinter is an example of the function of setting printer information.

In this embodiment, the printer object name 600 and printer setting information 602 shown in FIG. 8 are the printer setting information to be replaced. Since the printers A 200 and B 400 are of the same type, the operating system generally manages a common printer driver for printer objects of the same type.

The printer driver name 601 need not be handed over because the two printers have the same printer driver name. If printer drivers are separately managed, the setting may also be handed over.

The port information 603 is generally managed by the operating system in relation to the USB ID unique to each printer. If the port information 603 of another printer is handed over, no printing can be performed on a printer of interest. Therefore, the port information related by the Plug and Play manager 1001 shown in FIG. 4 when the printer B 400 is connected is directly used.

By the above processing, the printer setting information set for the printer A 200 and stored in the storage unit 102 can be used as the printer setting information of the printer B 400.

In step S9, the printer object of the printer A 200 is deleted. By this deletion, the printer B 400 is the only printer object displayed in the printer management window.

If printer information to be deleted is managed by the registry 1004 or the like, this printer information may also be deleted on the registry 1004. This deletion is equivalent to returning the printer setting information of a printer connected to the host computer to the state before installation.

In step S10, the printer object name of the printer B 400 is replaced with the printer object name of the printer A400. Since the printer object name 500 must be unique to each printer object, the process in step S9 is necessary.

More specifically, in the processes in steps S9 and S10, the operating system 1000 is notified of deletion of a printer object via the API function 1008, and deletes the corresponding printer object in response to this notification.

Likewise, the operating system 1000 is notified of the printer object name of the printer object, and replaces the corresponding printer object name in response to the notification. In the Windows operating system, DeletePrinter( ) is an example of the function of deleting printer information.

In this embodiment, printer object deletion is explained as an instruction to delete a printer object from the API function 1008 to the operating system 1000, or a process from the instruction to final deletion of the printer object performed by the operating system 1000 in response to the instruction.

Furthermore, in this embodiment, the processes are performed in the order of steps S8 to S10. However, the order of processes is not limited to this one, provided that the printer setting information, printer object name, and the like can be appropriately acquired.

The state of the printer information in the flow chart shown in FIG. 10 and the transition of the printer object display state in the printer management window displayed on the display unit 106 of this embodiment will be explained below with reference to FIG. 11.

Figure 11:
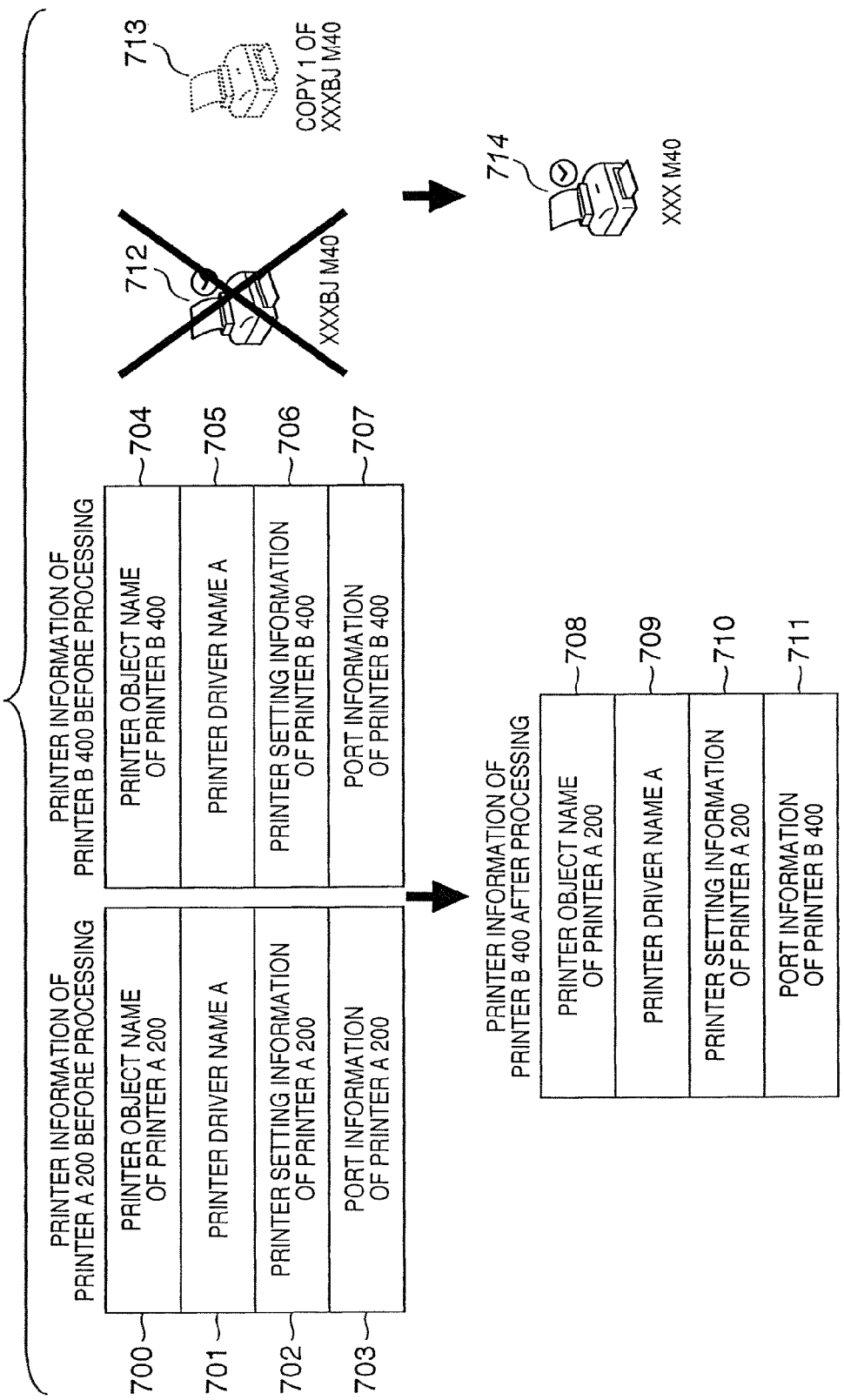
FIG. 11 is a view showing the transition of the state of printer information and the transition of the display state of printer objects in a printer management window of the most preferred embodiment of the present invention.

FIG. 11 is a view showing the state of the printer information and the transition of the printer object display state in the printer management window of the most preferred embodiment of the present invention.

The printer information of the printer A 200 before processing is made up of a printer object name 700, printer driver name A 701, printer setting information 702, and port information 703.

The printer information of the printer B 400 before processing is made up of a printer object name 704, printer driver name A 705, printer setting information 706, and port information 707.

After that, the printer information of the printer A 200 is deleted and the printer information of the printer B 400 is changed by the above processing. The processed printer information of the printer B 400 is made up of a printer object name 708 of the printer A 200, which is handed over in step S10, a printer driver name A 709 which is the same as that before the processing, printer setting information 710 of the printer A 200, which is handed over in step S8, and port information 711 of the printer B 400, which is the same as that before the processing.

A printer object 712 of the printer A 200 is deleted from the storage unit 102 by the process in step S9. On the other hand, a printer object 713 of the printer B 400 takes over the printer information of the printer A 200 by the processes in steps S8 and S10. As a consequence, a printer object 714 of the printer B 400 is obtained.

In this embodiment as described above, by controlling a printer object formed by the OS when a printer of the same type as a printer already installed in the host computer 100 is connected, it is possible to hand over (update) printer information from a printer object of the already installed printer to a printer object of the newly installed printer, and delete the printer object of the already installed printer. This makes it possible to use a printer object having the same settings as the already connected printer without switching the printer objects.

This means that when a user intends to selectively use a plurality of printers of the same type, he or she can use these printers without selecting a printer object or changing printer setting information.

That is, the user can use a plurality of printers of the same type by using the same printer setting information without switching printer objects.

Also, the present invention is particularly effective when applied to an environment in which a plurality of printers of the same type are managed in a certain enterprise group, and a user uses one of these managed printers at random.

In the most preferred embodiment, when a printer of the same type as an already installed printer is connected, portions (a printer object name and printer setting information) of the printer information of the existing printer object 712 are handed over (acquired) to the newly formed printer object 713 of the other printer, and the existing printer object 712 is deleted to generate a printer object 714. However, the reverse arrangement is also possible.

This reverse arrangement is particularly effective when port information is the USB ID.

That is, after a new printer object 713 is formed, a portion (port information) of the printer information of the new printer object 713 is handed over (acquired) to an existing printer object 712, and the new printer object 713 is then deleted to generate a printer object 714.

This processing is realized by replacing the contents of the process in step S7 shown in FIG. 9 of the most preferred embodiment. The printer object control process in step S7 of a modification of the most preferred embodiment will be described in detail below with reference to FIG. 12.

Figure 12:
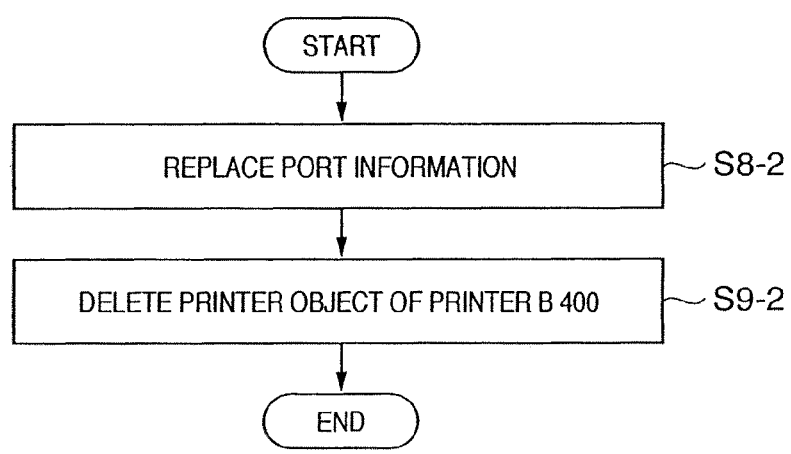
FIG. 12 is a flow chart showing details of a printer object control process of a modification of the embodiment shown in FIG. 10.

FIG. 12 is a flow chart showing details of the printer object control process of the modification of the most preferred embodiment of the present invention.

First, in step S8-2, port information of a printer B 400, which is stored in a storage unit 102, is replaced with port information of a printer A 200, which is stored in the storage unit 102. By this processing, the port information set for the printer B 400 can be replaced with the port information of the printer A 200.

In step S9-2, a printer object of the printer B 400, which is stored in the storage unit 102 is deleted. By this deletion, the printer A 200 is the only printer object displayed in a printer management window.

In the embodiment shown in FIG. 12, the processes are performed in the order of steps S8-2 and S9-2. However, this process order may also be reversed as long as the port information can be appropriately acquired.

The transition of the printer object display state in the printer management window displayed on a display unit 106 in the flow chart shown in FIG. 12 will be described below with reference to FIG. 13.

Figure 13:
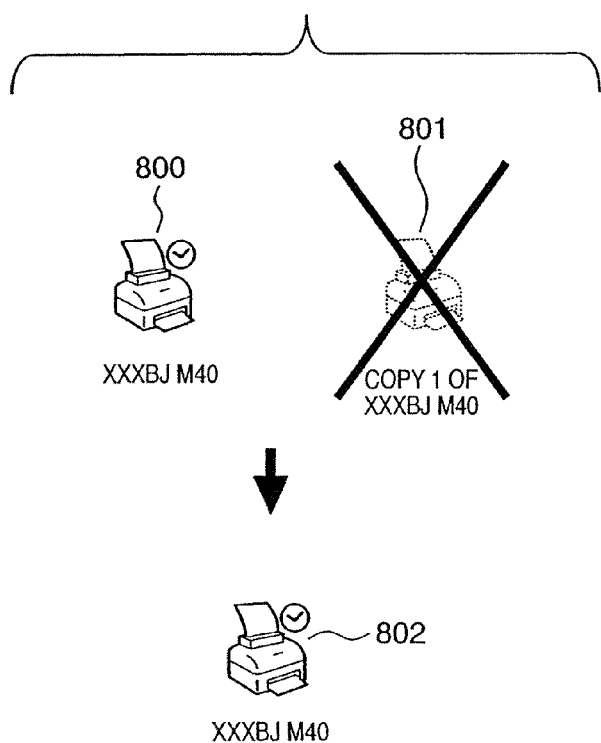
FIG. 13 is a view showing the transition of the display state of printer objects in a printer management window of the embodiment shown in FIG. 12.

FIG. 13 is a view showing the transition of the printer object display state in the printer management window of the embodiment shown in FIG. 12.

In FIG. 13, reference numeral 800 denotes a printer object of the printer A 200; and 801, a printer object of the printer B 400. The printer object 801 of the printer B 400 is deleted by the process in step S9-2. On the other hand, the printer object 800 of the printer A 200 takes over the port information of the printer B 400. As a consequence, a printer object 802 of the printer A 200 is obtained.

In the embodiment shown in FIG. 12 as described above, by controlling a printer object formed by an OS when a printer of the same type as a printer already installed in a host computer 100 is connected, it is possible to hand over (update) printer information from a printer object of the already installed printer to a printer object of the newly installed printer, and delete the printer object of the already installed printer. This makes it possible to use a printer object having the same settings as the already connected printer without switching the printer objects.

Also, in addition to the effects explained in the most preferred embodiment, the amount of information handed over between the printer objects can be reduced.

In an embodiment to be described in detail below with reference to FIG. 14, an example of a printer object control process different from that of the embodiment shown in FIG. 12 will be explained.

In the embodiments shown in FIGS. 10 and 12, if a printer object having printer information matching part of printer information of a new printer object already exists in the storage unit 102, at least a portion of the printer information of one of the existing printer object and new printer object is handed over to the printer information of the other, and the original printer object is deleted.

Figure 14:
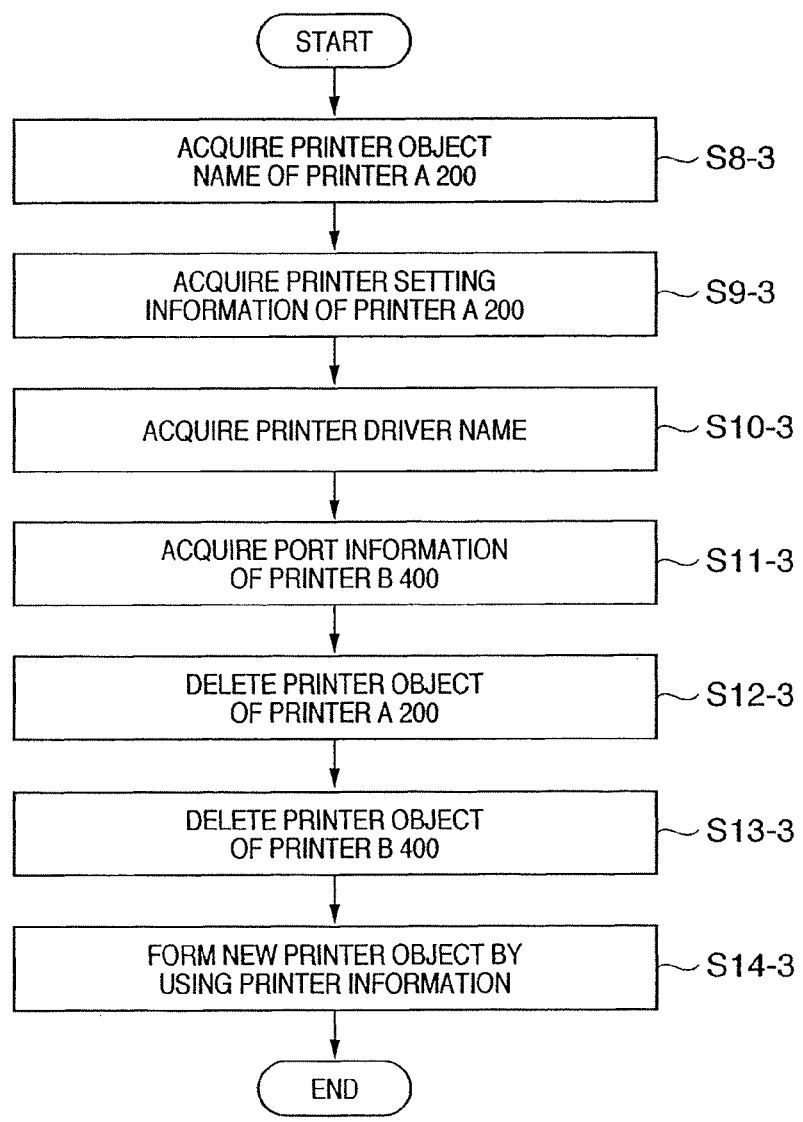
FIG. 14 is a flow chart showing details of a printer object control process of a modification of the embodiment shown in FIG. 10 or the embodiment shown in FIG. 12.

In the embodiment shown in FIG. 14, however, pieces of printer information of both a new printer object and existing printer object are merged, another new printer object is formed on the basis of the merged printer information, and the former new printer object and existing printer object are deleted.

This processing is realized by replacing the contents of the process in step S7 of FIG. 9. A printer object control process in step S7 of a modification will be described in detail below with reference to FIG. 14.

FIG. 14 is a flow chart showing details of the printer object control process of the modification of the embodiment shown in FIG. 10 or the embodiment shown in FIG. 12.

First, in step S8-3, a printer object name of a printer A 200 is acquired from printer information stored in a storage unit 102. In step S9-3, printer setting information of the printer A 200 is acquired. In step S10-3, a printer driver name of the printer A 200 (printer B 400) is acquired. In step S11-3, port information of the printer B 400 is acquired.

These pieces of information acquired in steps S8-3 to S11-3 are temporarily stored in the storage unit 102.

In step S12-3, a printer object of the printer A 200 is deleted from the storage unit 102. In step S13-3, a printer object of the printer B 400 is deleted.

In step S14-3, a new printer object is formed on the basis of the information acquired in steps S8-3 to S11-3, and stored in the storage unit 102.

The processes in steps S8-3 to S11-3 and steps S12-3 and S13-3 need not be performed in these orders and may also be realized in any arbitrary orders.

The transition of the printer object display state in a printer management window displayed on a display unit 106 in the flow chart shown in FIG. 14 will be explained below with reference to FIG. 15.

FIG. 15 is a view showing the transition of the printer object display state in the printer management window of the embodiment shown in FIG. 14.

In FIG. 15, reference numeral 900 denotes a printer object of the printer A 200; and 901, a printer object of the printer B 400. The printer object 900 of the printer A 200 is deleted by the process in step. S12-3. The printer object 901 of the printer B 400 is deleted by the process in step S13-3.

On the basis of the information acquired in steps S8-3 to S11-3, a printer object 902 is generated by the process in step S14-3.

Note that the process in step S14-3 can be so changed that the pieces of information acquired in steps S8-3 to S11-3 are updated after a new printer object is formed.

In the embodiment shown in FIG. 14 as described above, by controlling a printer object formed by an OS when a printer of the same type as a printer already installed in a host computer 100 is connected, it is possible to acquire necessary information from an existing printer object and new printer object, and form another new printer object on the basis of the acquired information. This makes it possible to use a printer object having the same settings as the already connected printer without switching the printer objects.

In the embodiments described above, if a printer object of the same type as a newly connected printer exists in the host computer 100, printer object formation or deletion is appropriately performed on the basis of the contents of a printer object of each related printer.

Depending on the application or purpose, however, it is desirable to maintain the presence of an existing printer object. In still another embodiment, therefore, in the printer object control process shown in FIG. 9, it is possible to designate a printer object to be controlled in the printer object control process by allowing designation of the type of printer to be controlled.

In the printer object control process shown in FIG. 9, the printer information of the printer (printer A 200) acquired in step S5 is compared with the printer information of the printer B 400 in step S6. If the two pieces of printer information match, the process in step S7 is performed.

In contrast, before the pieces of printer information are compared in step S6, the type of printer corresponding to a printer object to be controlled can be designated.

More specifically, the type of printer corresponding to a printer object to be controlled is designated as follows. The printer information as an object of comparison in step S6 is stored as an information file in a storage unit 102. When a utility tool 1007 is to be executed, this information file stored in the storage unit 102 is loaded into a RAM 1102 by using, e.g., an API function. The type of printer is designated by looking up the loaded information file.

Alternatively, instead of an information file, information equivalent to an information file is stored in a registry 1004. When the utility tool 1007 is to be executed, the contents of the registry 1004 are loaded into the RAM 1102 by using, e.g., an API function. The type of printer is designated by looking up the loaded contents.

Figure 16:
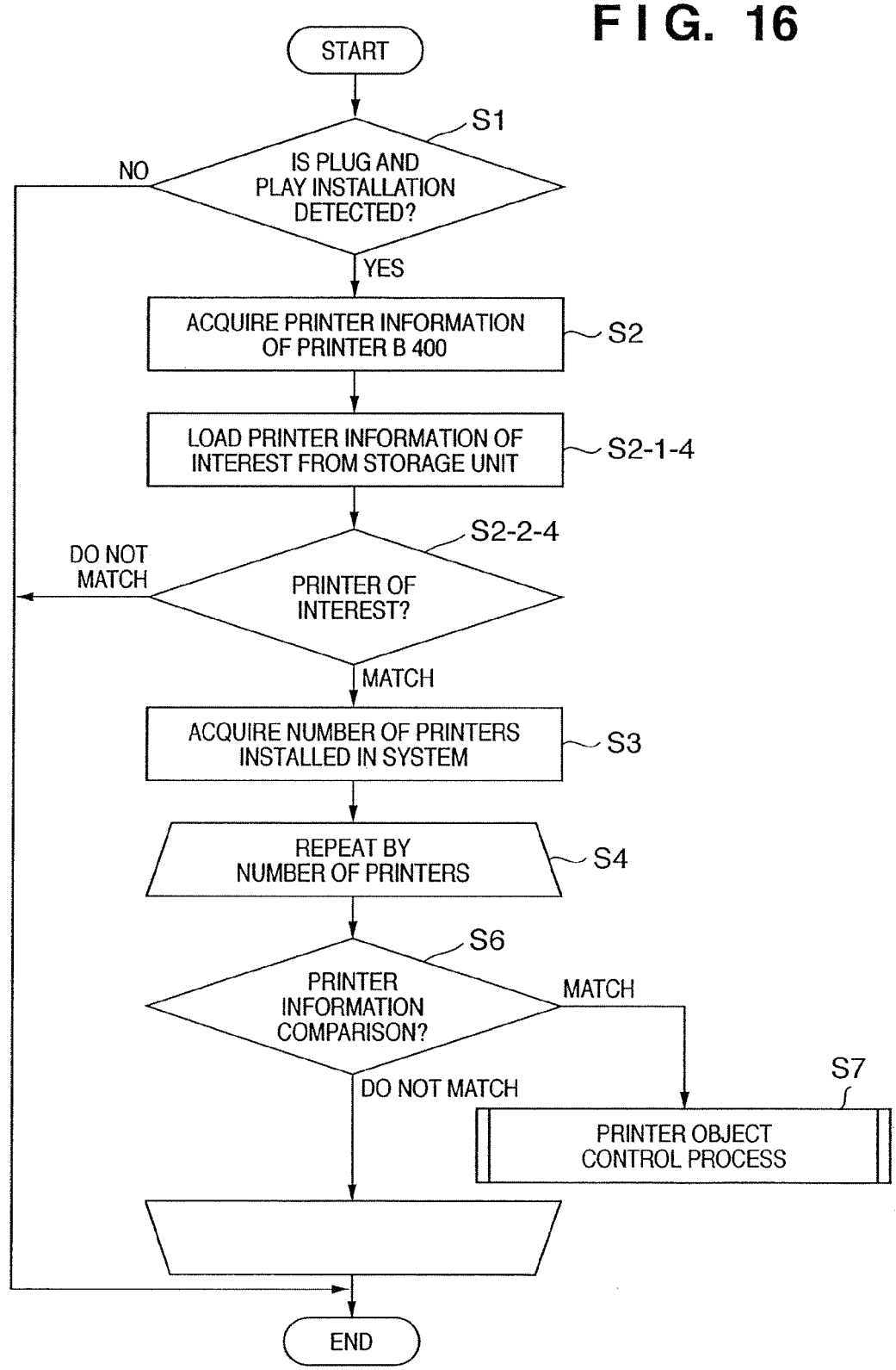
FIG. 16 is a flow chart showing a printer object control process of a modification of the embodiment shown in FIG. 9.

This processing is implemented by a printer object control process shown in FIG. 16 in which steps S2-1-4 and S2-2-4 are inserted between steps S2 and S3 shown in FIG. 9.

The printer object control process of a modification of the embodiment shown in FIG. 9 will be described below with reference to FIG. 16.

FIG. 16 is a flow chart showing the printer object control process of the modification of the embodiment shown in FIG. 9.

In this flow chart shown in FIG. 16, the same step numbers as in the flow chart shown in FIG. 9 denote the same steps, and a detailed explanation thereof will be omitted.

Printer information of a printer B 400 acquired in step S2 is information capable of discriminating the type of printer, e.g., a printer driver name stored in the storage unit 102 or the like.

In step S2-1-4, the printer information stored in the storage unit 102 is loaded into the RAM 1102 by using an API function 1008. This printer information loaded into the RAM 1102 is information which can discriminate the type of printer and can be compared with the contents of the printer information acquired in step S2.

In step S2-2-4, the printer information loaded in step S2-1-4 and the printer information of the printer B 400 acquired in step S2 are compared by using the API function 1008.

For example, if the printer information is a character string such as a printer driver name, whether two character strings match is determined by using, e.g., a strcmp function as the API function 1008.

If the two pieces of printer information do not match, it is determined that the printer is not an object of printer object control, and the processing is terminated. If the two pieces of printer information match, the processing from step S3 is executed.

In the embodiment shown in FIG. 16 as described above, by controlling a printer object corresponding to the type of printer designated at will when a printer of the same type as a printer already installed in a host computer 100 is connected, it is possible to hand over (update) port information of the already installed printer to the newly installed printer, and delete a printer object of the already installed printer. This makes it possible to use a printer object having the same settings as the already connected printer without switching the printer objects.

In particular, only when a newly connected printer is the same type of printer as a printer already installed in the host computer 100 and is a printer of the designated type, it is possible to hand over (update) port information from a printer object of the already installed printer to a printer object of the newly installed printer, and delete the printer object of the already installed printer. This prevents careless execution of the printer object control process.

In the embodiment shown in FIG. 10, the printer setting information of the printer A 200 is handed over in step S8 of FIG. 10. This printer information to be handed over is, e.g., the DEVMODE structure shown in FIG. 6.

The printer setting information (DEVMODE) 1208 is a structure representing setting information which a printer driver uses to perform printing from the host computer 100. In the embodiment shown in FIG. 10, the printer B 400 takes over the printer setting information 1208 of the printer A 200, so the printer setting information 1208 used by the printer A 200 is handed over.

It is, however, also possible to store the set contents of printer setting information (DEVMODE) 1208 beforehand as a setting information file in a storage unit 102 without handing over printer setting information 1208 from a printer A 200, and, when step S8 shown in FIG. 10 is to be executed, load the contents of the setting information file into a RAM 1102 by using an API function 1008 and use the loaded contents as printer setting information (DEVMODE) 1208 to be handed over.

Alternatively, it is possible to store not a setting information file but information equivalent to a setting information file in a registry 1004, and, when a utility tool 1007 is to be executed, load the contents of the registry 1004 into the RAM 1102 by using, e.g., the API function 1008 and use the loaded contents as printer setting information (DEVMODE) 1208 to be handed over.

This processing is implemented by a printer object control process shown in FIG. 17 in which steps S8-1-5 and S8-2-5 are added before step S8 shown in FIG. 10.

The printer object control process of a modification of the embodiment shown in FIG. 10 will be described in detail below with reference to FIG. 17.

FIG. 17 is a flow chart showing details of the printer object control process of the modification of the embodiment shown in FIG. 10.

In this flow chart shown in FIG. 17, the same step numbers as in the flow chart shown in FIG. 10 denote the same steps, and a detailed explanation thereof will be omitted.

Before execution of the process in step S8, in step S8-1-5, the printer setting information (DEVMODE) 1208 stored in the storage unit 102 is loaded into the RAM 1102 by using the API function 1008.

In step S8-2-5, the printer setting information (DEVMODE) 1208 acquired during the course of the process shown in FIG. 9 is replaced with the printer setting information (DEVMODE) acquired in step S8-1-5. For example, the information is replaced with the value stored in the RAM 1102.

In step S8, the value temporarily stored in step S8-2-5 is given as an argument of the API function 1008 to set the printer information in the target printer object. In the Windows operating system, SetPrinter is an example of the function of setting printer setting information.

In the embodiment shown in FIG. 17 as described above, by controlling a printer object formed by an OS when a printer of the same type as a printer already installed in a host computer 100 is connected, it is possible to hand over (update) port information of a printer object of the already installed printer to a printer object of the newly installed printer, and delete the printer object of the already installed printer. This makes it possible to use a printer object having the same settings as the already connected printer without switching the printer objects.

In particular, printing by predetermined settings is always possible by setting preset printing setting information in a printer object. Accordingly, even a user unfamiliar with printing can easily use the printer.

Also, when a manager is present, printing can always be performed by settings desired by this manager. This facilitates management of the printing results and the like.

In each embodiment described above, if a printer object having printer information partially matching printer information of a new printer object already exists in the storage unit 102, at least a portion of the printer information of one of the existing printer object and new printer object is handed over to the other printer information, and the original printer object is deleted. Alternatively, the two pieces of printer information of the new printer object and existing printer object are merged, another new printer object is formed on the basis of the merged printer information, and the former new printer object and existing printer object are deleted.

In addition to these processes, an embodiment to be described in detail below with reference to FIG. 18 executes a default printer setting process of setting a printer object processed by the printer object control process as a default printer of a host computer 100.

A default printer is a printer which is registered in a storage unit 102 by an operating system 1000 as a printer normally used by the host computer 100. This default printer is generally a printer which is preset as a printing destination printer when an application is initially activated.

The default printer setting process of a modification of each of the above embodiments will be described in detail below with reference to FIG. 18.

Figure 18:
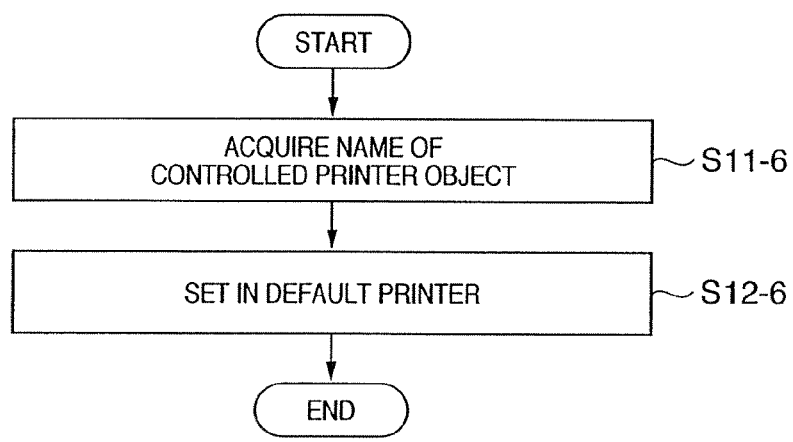
FIG. 18 is a flow chart showing details of a default printer setting process of a modification of the most preferred embodiment of the present invention.

FIG. 18 is a flow chart showing details of the default printer setting process of the modification of each of the above embodiments.

This flow chart shown in FIG. 18 is executed after step S10 of the flow chart shown in FIG. 10, or after step S14-3 of the flow chart shown in FIG. 14. Although the flow chart may also be executed after step S9-2 of the flow chart shown in FIG. 12, this flow chart is necessary if the existing printer object is a default printer.

First, in step S11-6, the name of a printer object whose control is complete before this step is acquired. For example, printer information stored in the storage unit 102 during the course of processing before this process or a value registered in a registry 1004 of the operating system 1000 is acquired as this name by using an API function 1008.

In step S12-6, a default printer to be registered in the host computer 100 is changed by using the printer object name acquired in step S11-6.

In the Windows operating system, SetDefaultPrinter is an example of the function of setting printer setting information. When this function is used, the printer object name is used as an argument of the function. If the operating system 1000 manages a default printer in the registry 1004, the printer object name may also be changed to the name of a currently acquired printer object.

Note that the flow chart shown in FIG. 18 is executed after step S10 of the flow chart shown in FIG. 10 or after step S14-3 of the flow chart shown in FIG. 14, because a default printer is changed by using the name of a printer object.

That is, if a default printer is changed by the flow chart shown in FIG. 18 before step S10 of the flow chart shown in FIG. 10, before step S14-3 of the flow chart shown in FIG. 14 or before step S14-3 in FIG. 9 but after step S10 in FIG. 5, no object name can be designated, or the name of a printer object is changed after the process shown in FIG. 18. As a consequence, the default printer cannot be accurately changed.

For the reason described above, the flow chart shown in FIG. 18 is preferably executed after step S10 of the flow chart shown in FIG. 10 or after step S14-3 of the flow chart shown in FIG. 14.

Also, in the embodiment shown in FIG. 18, a default printer is changed by using a printer object name. However, the default printer setting process may also be implemented on the basis of information for specifying a printer object.

In the embodiment shown in FIG. 18 as described above, a printer object processed by the printer object control process can be changed to a default printer. Accordingly, the printer can be recognized as a default printer by an application and the like, and can be used without changing any settings.

Each of the above-mentioned embodiments has been explained by taking an environment in which the printers A 200 and B 400 are alternately connected to the host computer 100 as an example. However, if the host computer 100 has a plurality of USB interfaces, an environment in which a plurality of printers are simultaneously connected is also possible.

If, for example, the processes in step 9 of the flow chart shown in FIG. 10, step S9-2 of the flow chart shown in FIG. 12, and steps S12-3 and S13-3 of the flow chart shown in FIG. 14 are executed when the printers A 200 and B 400 are simultaneously used, one or both of printer objects of the printers A 200 and B 400 are deleted, so one of the printers A 200 and B 400 becomes unusable.

In an embodiment to be described in detail below with reference to FIG. 19, therefore, a determination process of determining whether to connect a plurality of printers of the same type to a host computer 100 is performed, and a printer object control process is executed on the basis of the determination result.

Figure 19:
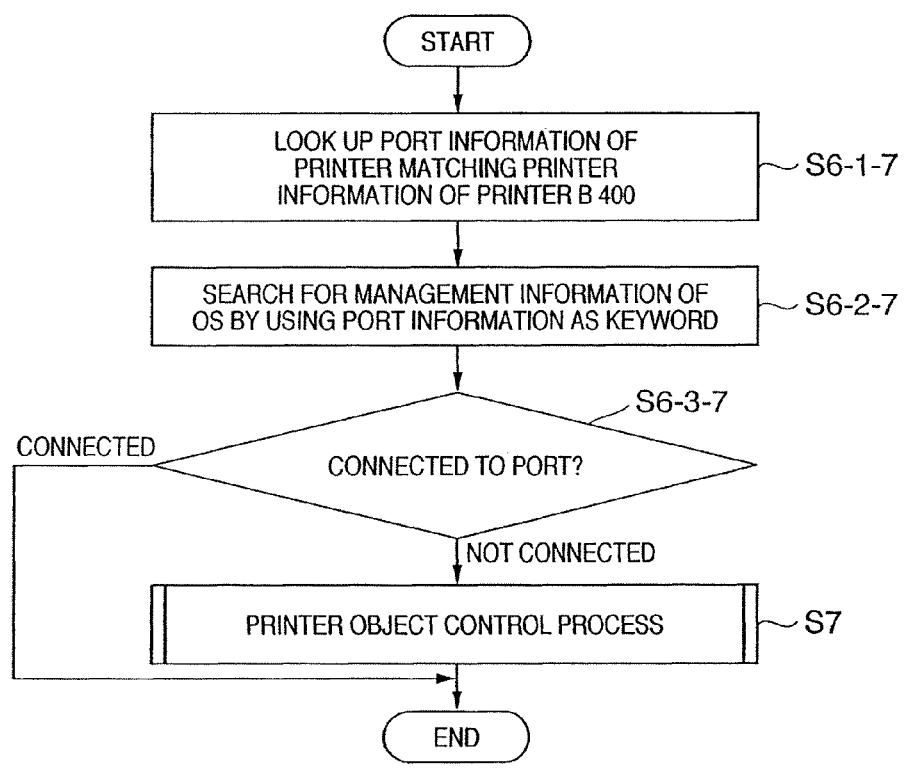
FIG. 19 is a flow chart showing details of a determination process of a modification of each embodiment.

This processing is implemented by a determination process (which replaces step S7 in FIG. 9) shown in FIG. 19 in which steps S6-1-7 to S6-3-7 are added before step S7 in FIG. 9.

The determination process of a modification of each of the above embodiments will be described in detail below with reference to FIG. 19.

FIG. 19 is a flow chart showing details of the determination process of the modification of each of the above embodiments.

In step S6-1-7, printer information matching printer information of a printer B 400 is looked up. Since this printer information is already acquired in step S5 of FIG. 9, the printer information stored in a storage unit 102 is loaded, and port information contained in the loaded printer information is looked up.

In step S6-2-7, management information of a port managed by an operating system 1000 is searched for by using the port information looked up in step S6-1-7 as a keyword. This management information as a search destination is managed by, e.g., a registry 1004.

When a device is connected to the interface of the host computer 100, the operating system 1000 generally stores information of the connected device and management information for managing the status of the port in, e.g., the registry 104. In the embodiment shown in FIG. 19, therefore, whether a printer is connected (valid) is determined by using this management information.

In step S6-3-7, whether a printer is connected (valid) to a port is determined on the basis of the management information of the port found in step S6-2-7. If a printer is connected, the processing is terminated without performing the printer object control process in step S7. If no printer is connected, the flow advances to step S7 to perform the printer object control process.

Figure 20:
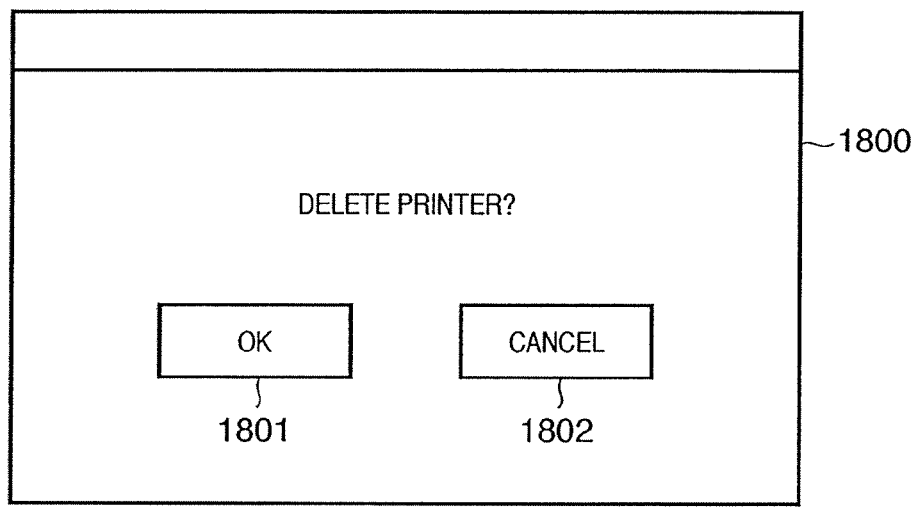
FIG. 20 is a view showing an example of a check window of the embodiment shown in FIG. 19.

It is also possible to give a user an opportunity of executing the printer object control process in step S7, even if a printer is connected in step S6-3-7. In this case, it is possible to display, on the host computer 100, a check window 1800 (FIG. 20) for checking the presence/absence of execution of the printer object control process, and execute the printer object control process in accordance with an operation (of an OK button 1801 or cancel button 1802) via the check window 1800.

In the embodiment shown in FIG. 19 as described above, when a printer of the same type as a printer already installed in the host computer 100 is connected, if no other printer of the same type is already connected to the host computer 100, it is possible, by controlling a printer object formed by the OS, to hand over (update) port information from a printer object of the already installed printer to a printer object of the newly installed printer, and delete the printer object of the already installed printer. This makes it possible to use a printer object having the same settings as the already connected printer without changing the printer objects.

Also, even when a plurality of printers of the same type are connected to the host computer 100, each printer can be used without making any already connected printer unusable.

In the embodiment shown in FIG. 19, if a printer object having printer information matching the printer information of the printer B 400 already exists in the storage unit 102, whether the printer is connected to the port is determined in step S6-3-7 of FIG. 19 on the basis of port information of the existing printer object. On the basis of the determination result, the printer object control process is executed.

In an embodiment to be described in detail below with reference to FIG. 21, however, in addition to the arrangement of the embodiment shown in FIG. 19, if a printer is already connected, whether the port of a printer object of the printer is a network port is determined. On the basis of the determination result, a printer object control process is performed.

This implements a printer object control process which better meets the application or purpose of a user.

This processing is implemented by a determination process (which replaces step S7 shown in FIG. 9) in which steps S6-1-8 and S6-2-8 are added if a printer is already connected in step S6-3-7 shown in FIG. 9.

The determination process of a modification of the embodiment shown in FIG. 19 will be explained in detail below with reference to FIG. 21.

Figure 21:
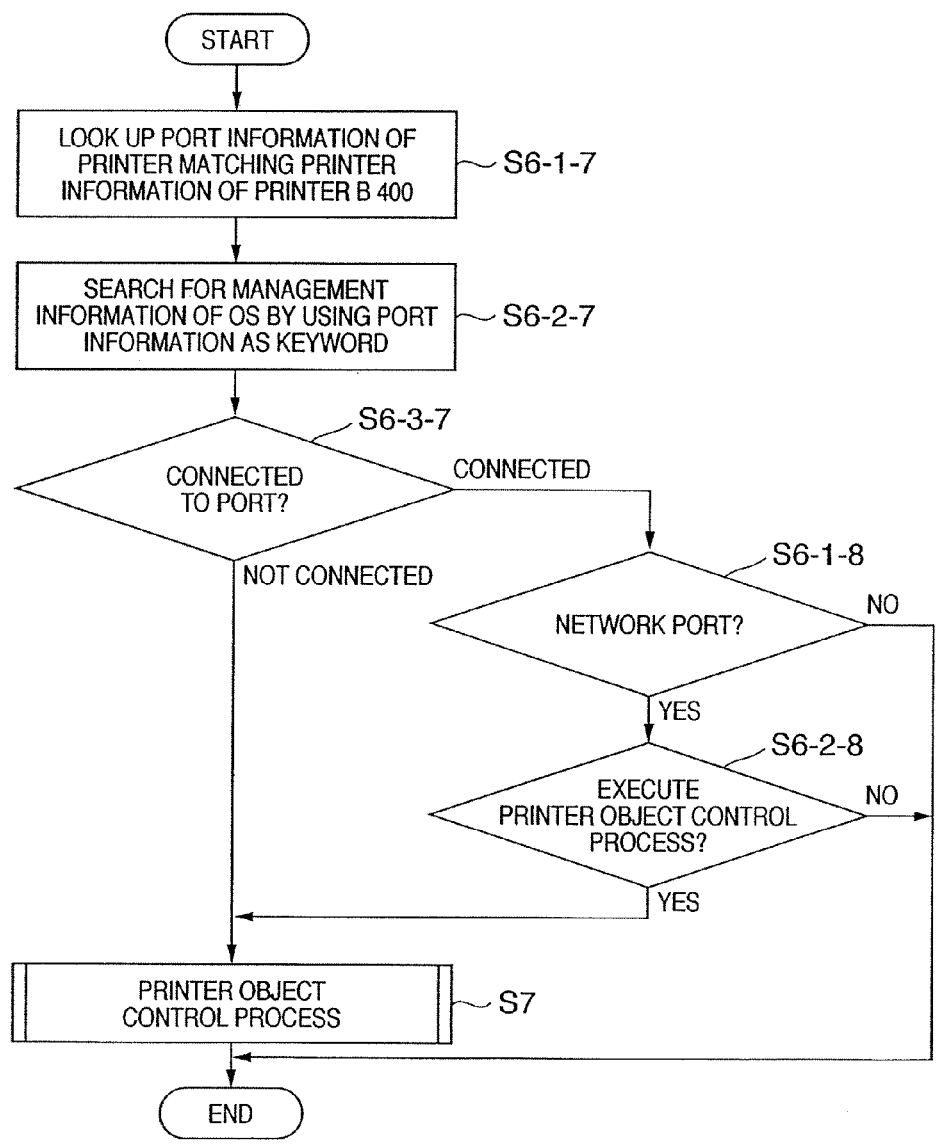
FIG. 21 is a flow chart showing details of a determination process of a modification of the embodiment shown in FIG. 19.

FIG. 21 is a flow chart showing details of the determination process of the modification of the embodiment shown in FIG. 19.

Referring to FIG. 21, the same step numbers as in the flow chart shown in FIG. 19 denote the same steps, and a detailed description thereof will be omitted.

In port information as part of printer information of a printer object, it is generally possible to designate a network address in addition to a USB port. In the Windows operating system, for example, a network path name "¥¥Network¥PrinterA" is generally designated as the network address.

In the embodiment shown in FIG. 21, therefore, if a printer is already connected in step S6-3-7, whether port information of a printer object of the printer is a network port is determined in step S6-1-8.

This determination is done by determining whether "¥¥" indicating a network port is contained in the port information of the existing printer object. Also, information comparison is performed by using an API function 1008.

If the port is not a network port in step S6-1-8 (NO in step S6-1-8), the processing is terminated without performing the printer object control process in step S7. If the port is a network port (YES in step S6-1-8), the flow advances to step S6-2-8.

In step S6-2-8, a check window 1800 (FIG. 20) is displayed to determine the presence/absence of execution of the printer object control process. If an OK button 1801 is operated in the check window 1800 (YES in step S6-2-8), the flow advances to step S7 to execute the printer object control process. If a cancel button is operated in the check window 1800 (NO in step S6-2-8), the processing is terminated without performing the printer object control process in step S7.

In the embodiment shown in FIG. 21, step S6-1-8 is performed after step S6-3-7. However, it is also possible to execute only the processes in steps S6-1-8 and S6-2-8 without executing steps S6-1-7 to S6-3-7.

Also, whether the port is a network port is determined in step S6-1-8. However, it is also possible to determine whether the port is, e.g., an IEEE1394 port, Bluetooth port, radio LAN port, or parallel port, and execute the printer object control process on the basis of the determination result.

In the embodiment shown in FIG. 21 as described above, if a printer already installed in a host computer 100 is not connected or a network port is connected when a printer of the same type as the already installed printer is connected, it is possible, by controlling a printer object formed by an OS, to hand over (update) port information from a printer object of the already installed printer to a printer object of the newly installed printer, and delete the printer object of the already installed printer. This makes it possible to use a printer object having the same settings as the already connected printer without switching the printer objects.

In particular, a network printer is shared by a plurality of users and hence is generally managed independently of a printer directly connected to a host computer and singly used. In the embodiment shown in FIG. 21, a user is given an opportunity of determining whether to distinguish between printer objects of a connected printer and existing printer. This provides a printer object control environment more suitable to the intention of the user.

In the most preferred embodiment (FIG. 10), as shown in FIG. 11, when a printer of the same type as an already installed printer is connected, portions (the printer object name and printer setting information) of the printer information of the existing printer object 712 are handed over (acquired) to the newly formed printer object 713 of the other printer, the existing printer object 712 is deleted, and the printer object 714 is generated. However, these processes may also be combined in accordance with conditions.

In the Windows operating system, for example, when a certain printer object is to be operated, it is possible to set access right which is given to a user or program looking up the printer object. This access right is generally set in printer object control.

In an embodiment to be described in detail below with reference to FIG. 22, therefore, the contents of a printer object control process are limited on the basis of this access right (printer management authority) to a printer object.

It comes near to stating the obvious that another way of saying printer management authority is access right of a System Manager level.

By executing this processing, the contents of a printer object control process can be set in accordance with the application or purpose.

Figure 22:
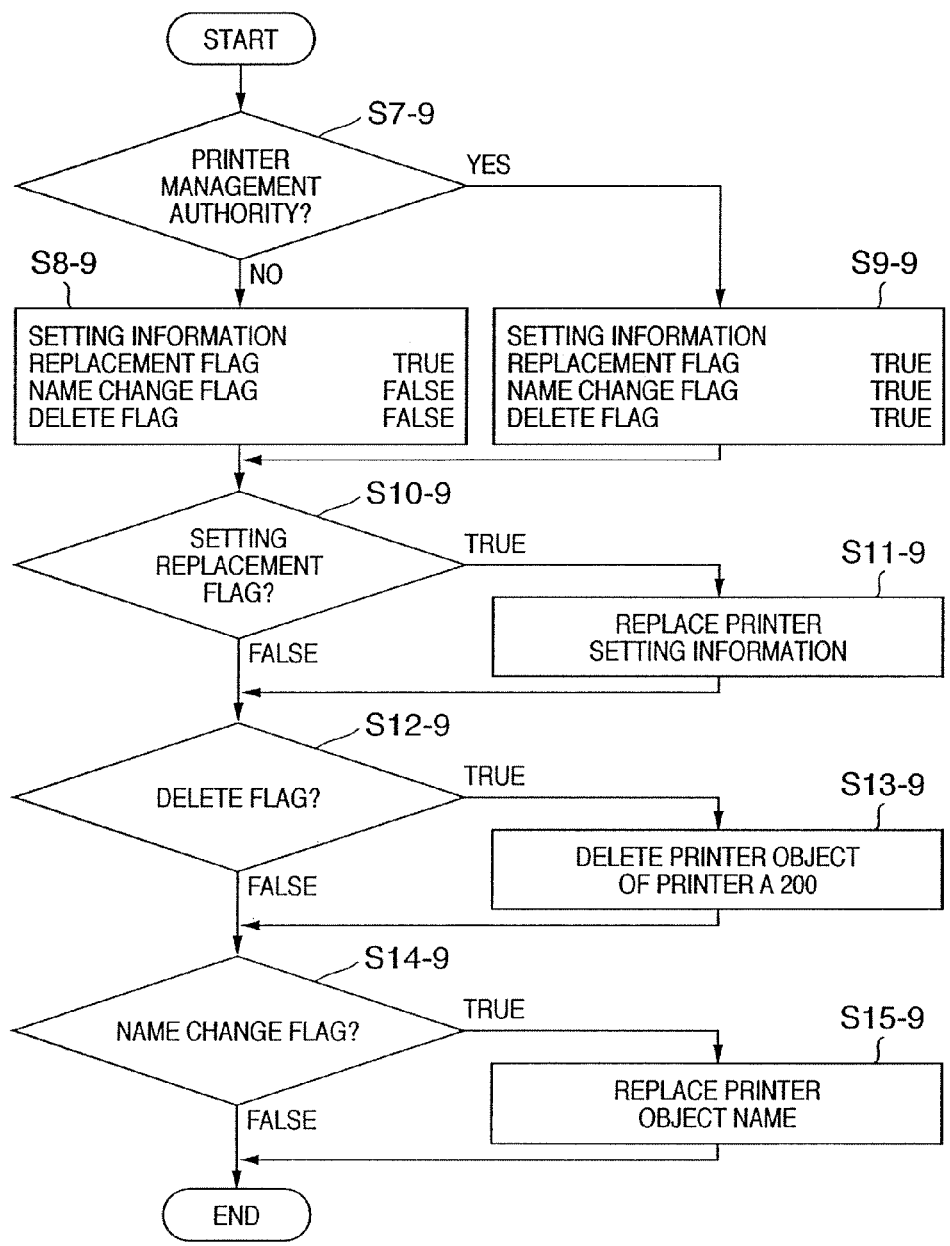
FIG. 22 is a flow chart showing details of a printer object control process of a modification of the embodiment shown in FIG. 9.

This processing is implemented by a printer object control process shown in FIG. 22 in which step S7 shown in FIG. 9 is replaced with steps S7-9 to S15-9.

The printer object control process of a modification of the embodiment shown in FIG. 9 will be described in detail below with reference to FIG. 22.

FIG. 22 is a flow chart showing details of the printer object control process of the modification of the embodiment shown in FIG. 9.

First, in step S7-9, whether a user who has logged in to an operating system has the printer management authority is determined.

Various methods are possible as this determination. For example, the presence/absence of the printer management authority in the Windows operating system is determined by using an API function such as OpenPrinter. This API function acquires a handle of a printer to be controlled. The handle is a value which is assured of being a unique numerical value in the system and is necessary to access a printer object.

Whether the user has the printer management authority can be determined by determining whether the handle can be acquired by the printer management authority by using the API function.

In the embodiment shown in FIG. 22, a user having the printer management authority can replace printer setting information, delete a printer object, and change a printer object name. A user having no printer management authority can replace printer setting information but can neither delete a printer object nor change the name of a printer object.

The contents of processing restricted by the printer object control process based on the printer management authority are not limited to those described above. That is, it is of course also possible to set various combinations in accordance with applications or purposes. The presence/absence of execution of the contents of processing is set by using, e.g., flags.

If the user has no printer management authority in step S7-9 (NO in step S7-9), the flow advances to step S8-9 to set a setting information replacement flag to TRUE and a name change flag and printer delete flag to FALSE, as flags indicating the presence/absence of execution of the contents of the printer object control process. The set contents are stored in a storage unit 102 or the like.

If the user has the printer management authority in step S7-9 (YES in step S7-9), the flow advances to step S9-9 to set a setting information replacement flag, name change flag, and printer delete flag to TRUE, as flags indicating the presence/absence of execution of the contents of the printer object control process. The set contents are stored in the storage unit 102 or the like.

In step S10-9, the contents of the setting replacement flag are checked by looking up the storage unit 102. If the setting replacement flag is TRUE, the flow advances to step S11-9 to replace the printer setting information. This is equivalent to step S8 shown in FIG. 10. After that, the flow advances to step S12-9. If the setting replacement flag is FALSE, the flow advances to step S12-9 without replacing the printer setting information.

In step S12-9, the contents of the delete flag are checked by looking up the storage unit 102. If the delete flag is TRUE, the flow advances to step S13-9 to delete a printer object of a printer A 200. This is equivalent to step S9 shown in FIG. 10. After that, the flow advances to step S14-9. If the delete flag is FALSE, the flow advances to step S14-9 without deleting the printer object.

In step S14-9, the contents of the name change flag is checked by looking up the storage unit 102. If the name change flag is TRUE, the flow advances to step S15-9 to replace the printer object name. This is equivalent to step S10 shown in FIG. 10. After that, the process is terminated. If the name change flag is FALSE, the process is terminated without replacing the printer object name.

In the embodiment shown in FIG. 22 as described above, when a printer of the same type as a printer already installed in a host computer 100 is connected, the contents of control for a printer object formed by an OS are limited (designated) in accordance with whether the user has the printer management authority. This makes it possible to hand over (update) printer setting information, hand over (update) port information from a printer object of the already installed printer to a printer object of the newly installed printer, and delete the printer object of the already installed printer.

Each of the above embodiments has been explained by taking a printer as an example of a device connectable to a host computer. However, the present invention is also applicable to devices other than a printer, e.g., various peripheral devices such as a scanner and digital camera. In this case, each embodiment is practiced by using a device object and device information corresponding to a device to which the embodiment is applied, instead of the printer object and printer information described above.

It is also possible to implement an embodiment by freely combining the above-mentioned embodiments in accordance with the application or purpose.

Although the embodiments are described in detail above, the present invention can also take the form of an embodiment such as a system, apparatus, method, program, or storage medium. More specifically, the present invention is applicable to a system comprising a plurality of apparatuses or to an apparatus comprising a single device.

The present invention can also be achieved by supplying a program (in the embodiments, a program corresponding to the flow charts shown in the drawings) of software for implementing the functions of the above-mentioned embodiments to a system or apparatus directly or from a remote place, and allowing a computer of the system or apparatus to read out and execute the supplied program code.

Accordingly, the program code itself installed in the computer to implement the functional processing of the present invention by the computer also implements the present invention. That is, the present invention includes the computer program itself for implementing the functional processing of the present invention.

The program can take any form such as an object code, a program executed by an interpreter, and script data to be supplied to an OS, provided that the program has program functions.

Examples of a recording medium for supplying the program are a floppy (registered trademark) disk, hard disk, optical disk, magnetooptical disk, MO, CD-ROM, CD-R, CD-RW, magnetic tape, nonvolatile memory card, ROM, and DVD (DVD-ROM, DVD-R, DVD-RW, DVD+R, and DVD+RW).

The program can also be supplied by connecting to a homepage on the Internet by using a browser of a client computer, and downloading the computer program itself of the present invention or a compressed file including an automatic installation function from the homepage to a recording medium such as a hard disk. It is also possible to divide the program code forming the program of the present invention into a plurality of files, and download the individual files from different homepages. That is, the present invention includes a WWW server which allows a plurality of users to download program files for implementing the functional processing of the present invention by a computer.

Furthermore, the program of the present invention can also be encrypted and distributed to users by storing the program in a storage medium such as a CD-ROM. In this case, a user who has cleared predetermined conditions is allowed to download key information for decryption from a homepage across the Internet. The encrypted program is executed by using the key information, and the functional processing of the present invention is implemented by installing the program in the computer.

Also, besides the functions of the above embodiments are implemented by executing the readout program code by the computer, the functions of the embodiments can be implemented when an OS or the like running on the computer performs part or the whole of actual processing on the basis of designations by the program.

Furthermore, the functions of the above embodiments can be implemented when the program read out from the recording medium is written in a memory of a function expansion board inserted into the computer or of a function expansion unit connected to the computer, and a CPU or the like of the function expansion board or function expansion unit performs part or the whole of actual processing on the basis of designations by the program.

The present invention is not limited to the above embodiments and various changes and modifications can be made within the spirit and scope of the present invention. Therefore, to apprise the public of the scope of the present invention, the following claims are made.

What is claimed is:

1. An information processing apparatus including: an operating system with at least a detection function for detecting a connection of devices, a generation function for generating device objects identifying device management information for detected devices, and a storage function for storing the generated device objects, and a computer-readable storage medium storing computer-executable code for a receptor, a comparator, a rewriter, and a deleter, the information processing apparatus comprising:

the receptor, which is adapted to receive a notification from the operating system identifying a connection of a new device, in response to a detection by the detection function of the operating system;

the comparator, which is adapted to compare first device type information of a first device object specified by the notification with second device type information of a second device object previously generated by the operating system before the first device object was generated;

the rewriter, which is adapted to rewrite information of the second device object using information of the first device object in a case where the comparator determines that the first device type information and the second device type information match; and the deleter, which is adapted to delete the first device object in a case where the comparator determines that the first device type information and the second device type information match, wherein the rewriter is arranged to rewrite device port information of the second device object with device port information of the first device object.

2. The apparatus according to claim 1, further comprising a selector, which is adapted to select whether or not to delete the first device object, wherein the deleter is arranged to delete the first device object when the selector selects that the first device object is to be deleted.

3. The apparatus according to claim 1, wherein each device object has information for managing an icon image corresponding to that device object.

4. The apparatus according to claim 1, further comprising a controller, which is adapted to control at least one of the deleter and the rewriter, using system manager level access rights to control a device object.

5. An information processing apparatus including: an operating system with at least a detection function for detecting a connection of devices, a generation function for generating device objects identifying device management information for detected devices, and a storage function for storing the generated device objects, and a computer-readable storage medium storing computer-executable code for a receptor, a comparator, a generator, and a deleter, the information processing apparatus, comprising:

the receptor, which is adapted to receive a notification from the operating system identifying a connection of a new device, in response to a detection by the detection function of the operating system;

the comparator, which is adapted to compare first device type information of a first device object specified by the notification with second device type information of a second device object previously generated by the operating system before the first device object was generated;

the generator, which is adapted to generate a third device object using information of the first device object and information of the second device object in a case where the comparator determines that the first device type information and the second device type information match; and the deleter, which is adapted to delete the first device object and the second device object in a case where the comparator determines that the first device type information and the second device type information match, wherein the generator is arranged to generate the third device object using device port information of the first device object and using at least one of device setting information and a device object name of the second device object.

6. The apparatus according to claim 5, wherein the generator includes a rewriter, which is adapted to rewrite device port information of the third device object with device port information of the first device object and to rewrite at least one of device setting information and a device object name of the third device object with one of device setting information and a device object name of the second device object.

7. A method of controlling an information processing apparatus having an operating system that includes a detection function, the method comprising:

detecting, by the operating system, a connection of a device to the information processing apparatus;

generating a device object that includes device management information for detected devices, storing the generated device object in the information processing apparatus, receiving, from the operating system, a notification identifying a connection of a new device in response to a detection by the detection function of the operating system;

comparing first device type information of a first device object specified by the notification with second device type information of a second device object previously generated by the operating system before the first device object was generated;

rewriting information of the second device object using information of the first device object in a case where it is determined, as a result of the comparing, that the first device type information and the second device type information match; and deleting the first device object in a case where the first device type information and the second device type information have been determined to match, based on the result of the comparing, wherein the rewriting includes rewriting device port information of the second device object with device port information of the first device object.

8. The method according to claim 7, further comprising selecting whether or not to delete the first device object, and deleting the first device object when it is determined that the first device object is to be deleted.

9. The method according to claim 7, wherein each device object has information for managing an icon image corresponding to that device object.

10. The method according to claim 7, further comprising controlling at least one of the deleting and the rewriting, using system manager level access rights to control a device object.

11. A method of controlling an information processing apparatus that includes an operating system with a detection function, the method comprising:

detecting, by the operating system, a connection of a device to the information processing apparatus;

generating a device object that includes device management information for the detected device;

storing the generated device object in the information processing apparatus;

receiving, from the operating system, a notification identifying a connection of a new device in response to a detection by the detection function of the operating system;

comparing first device type information of a first device object specified by the notification with second device type information of a second device object previously generated by the operating system before the first device object was generated;

generating a third device object using information of the first device object and information of the second device object in a case where it is determined, as a result of the comparing, that the first device type information and the second device type information match; and deleting the first device object and the second device object in a case where the first device type information and the second device type information have been determined to match, based on the result of the comparing, wherein the generating includes generating the third device object using device port information of the first device object and using at least one of device setting information and a device object name of the second device object.

12. The method according to claim 11, wherein the generating includes rewriting device port information of the third device object with device port information of the first device object and rewriting at least one of device setting information and a device object name of the third device object with one of device setting information and a device object name of the second device object.

13. A non-transitory computer-readable storage medium storing computer-executable program code for causing a programmable computer to operate as an information processing apparatus, wherein the information processing apparatus includes: an operating system with at least a detection function for detecting a connection of devices, a generation function for generating device objects identifying device management information for detected devices, and a storage function for storing the generated device objects, and wherein the program code is comprised of:

a receptor module, which is adapted to receive a notification from the operating system identifying a connection of a new device, in response to a detection by the detection function by the operating system;

a comparator module, which is adapted to compare first device type information of a first device object specified by the notification with second device type information of a second device object previously generated by the operating system before the first device object was generated;

a rewriter module, which is adapted to rewrite information of the second device object using information of the first device object in a case where it is determined by the comparator module that the first device type information and the second device type information match; and a deleter module, which is adapted to delete the first device object in a case where it is determined by the comparator module that the first device type information and the second device type information match, wherein the rewriter module is configured to rewrite device port information of the second device object with device port information of the first device object.

14. A non-transitory computer-readable storage medium storing computer-executable program code for causing a programmable computer to operate as an information processing apparatus, wherein the information processing apparatus includes: an operating system with at least a detection function for detecting a connection of devices, a generation function for generating device objects identifying device management information for detected devices, and a storage function for storing the generated device objects, and wherein the program code is comprised of:

a receptor module, which is adapted to receive a notification from the operating system identifying a connection of a new device, in response to a detection by the detection function of the operating system;

a comparator module, which is adapted to compare first device type information of a first device object specified by the notification with second device type information of a second device object previously generated by the operating system before the first device object was generated;

a generator module, which is adapted to generate a third device object using information of the first device object and information of the second device object in a case where it is determined by the comparator module that the first device type information and the second device type information match; and a deleter module, which is adapted to delete the first device object and the second device object in a case where it is determined by the comparator module that the first device type information and the second device type information match, wherein the generator module is configured to generate the third device object using device port information of the first device object and using at least one of device setting information and a device object name of the second device object.

15. An information processing apparatus that controls a process of displaying, on a display unit, at least one device object including device information generated for at least one device according to when the at least one device is connected to the information processing apparatus, as at least one device icon, the apparatus comprising:

a computer processor cooperating with a memory, wherein the processor and the memory cooperate to acquire device information of a new device object generated according to when a new device is connected to the information processing apparatus, and device information of an existing device object corresponding to an existing device different from the new device, the device information of the existing device being generated before the device information of the new device object; and a display control unit adapted to display at least one icon on a display unit using the device information acquired;

wherein, when type information included in the device information of the existing device object matches type information included in the device information of the new device object, the display control unit controls the display unit to display a new device icon corresponding to the new device object and not to display an existing device icon corresponding to the existing device object.

16. An information processing apparatus that controls a process of displaying, on a display unit, at least one device object including device information generated for at least one device according to when the at least one device is connected to the information processing apparatus, as at least one device icon, the apparatus comprising:

a computer processor cooperating with a memory, wherein the processor and the memory cooperate to acquire device information of a new device object generated according to when a new device is connected to the information processing apparatus, and device information of an existing device object corresponding to an existing device different from the new device, the device information of the existing device being generated before the device information of the new device object; and a display control unit adapted to display at least one device icon on a display unit using the device information acquired;

wherein, when type information included in the device information of the existing device object matches type information included in the device information of the new device object, the display control unit controls the display unit to display an existing device icon corresponding to the existing device object and not to display a new device icon corresponding to the new device object.

17. An information processing apparatus that controls a process of displaying, on a display unit, at least one device object including device information generated for at least one device according to when the at least one device is connected to the information processing apparatus, as at least one device icon, the apparatus comprising:

a computer processor cooperating with a memory, wherein the processor and the memory cooperate to acquire device information of a new device object generated according to when a new device is connected to the information processing apparatus, and device information of an existing device object corresponding to an existing device different from the new device, the device information of the existing device being generated before the device information of the new device object; and a display control unit adapted to display at least one device icon on the display unit using the device information acquired by the acquisition unit;

wherein, when type information included in the device information of the existing device object matches type information included in the device information of the new device object, the display control unit controls the display unit to display a single device icon and not to display an existing device icon corresponding to the existing device object and a new device icon corresponding to the new device object.

18. A method performed by an information processing apparatus that controls a process of displaying, on a display unit, at least one device object including device information generated for at least one device according to when the at least one device is connected to the information processing apparatus, as at least one device icon, the method comprising:

acquiring device information of a new device object generated according to when a new device is connected to the information processing apparatus, and device information of an existing device object corresponding to an existing device different from the new device, the device information of the existing device being generated before the device information of the new device object; and controlling a display unit to display at least one icon using the device information acquired by the acquiring;

wherein, when type information included in the device information of the existing device object matches type information included in the device information of the new device object, the display unit is controlled to display a new device icon corresponding to the new device object and not to display an existing device icon corresponding to the existing device object.

19. A method performed by an information processing apparatus that controls a process of displaying, on a display unit, at least one device object including device information generated for at least one device according to when the at least one device is connected, as at least one device icon, the method comprising:

acquiring device information of a new device object generated according to when a new device is connected to the information processing apparatus, and device information of an existing device object corresponding to an existing device different from the new device, the device information of the existing device being generated before the device information of the new device object; and controlling a display unit to display at least one device icon using the device information acquired by the acquiring;

wherein, when type information included in the device information of the existing device object matches type information included in the device information of the new device object, the display unit is controlled to display an existing device icon corresponding to the existing device object and not to display a new device icon corresponding to the new device object.

20. A method performed by an information processing apparatus that controls a process of displaying, on a display unit, at least one device object including device information generated for at least one device according to when the at least one device is connected to the information processing apparatus, as at least one device icon, the method comprising:

acquiring device information of a new device object generated according to when a new device is connected to the information processing apparatus, and device information of an existing device object corresponding to an existing device different from the new device, the device information of the existing device being generated before the device information of the new device object; and controlling a display unit to display at least one device icon using the device information acquired by the acquiring;

wherein, when type information included in the device information of the existing device object matches type information included in the device information of the new device object, the display control unit controls the display unit to display a single device icon and not to display an existing device icon corresponding to the existing device object and a new device icon corresponding to the new device object.

21. A non-transitory computer-readable storage medium storing computer-executable code that, when executed by a processor of an information processing apparatus that controls a process of displaying, on a display unit, at least one device object including device information generated for at least one device according to when the at least one device is connected to the information processing apparatus, as at least one device icon, causes the information processing apparatus to perform a method comprising:

acquiring device information of a new device object generated according to when a new device is connected to the information processing apparatus, and device information of an existing device object corresponding to an existing device different from the new device, the device information of the existing device being generated before the device information of the new device object; and controlling a display unit to display at least one icon using the device information acquired by the acquiring;

wherein, when type information included in the device information of the existing device object matches type information included in the device information of the new device object, the display unit is controlled to display a new device icon corresponding to the new device object and not to display an existing device icon corresponding to the existing device object.

22. A non-transitory computer-readable storage medium storing computer-executable code that, when executed by a processor of an information processing apparatus that controls a process of displaying, on a display unit, at least one device object including device information generated for at least one device according to when the at least one device is connected to the information processing apparatus, as at least one device icon, causes the information processing apparatus to perform a method comprising:

acquiring device information of a new device object generated according to when a new device is connected to the information processing apparatus, and device information of an existing device object corresponding to an existing device different from the new device, the device information of the existing device being generated before the device information of the new device object; and controlling a display unit to display at least one device icon using the device information acquired by the acquiring;

wherein, when type information included in the device information of the existing device object matches type information included in the device information of the new device object, the display unit is controlled to display an existing device icon corresponding to the existing device object and not to display a new device icon corresponding to the new device object.

23. A non-transitory computer-readable storage medium storing computer-executable code that, when executed by a processor of an information processing apparatus that controls a process of displaying, on a display unit, at least one device object including device information generated for at least one device according to when the at least one device is connected to the information processing apparatus, as at least one device icon, causes the information processing apparatus to perform a method comprising:

acquiring device information of a new device object generated according to when a new device is connected to the information processing apparatus, and device information of an existing device object corresponding to an existing device different from the new device, the device information of the existing device being generated before the device information of the new device object; and controlling a display unit to display at least one device icon using the device information acquired by the acquiring;

wherein, when type information included in the device information of the existing device object matches type information included in the device information of the new device object, the display control unit controls the display unit to display a single device icon and not to display an existing device icon corresponding to the existing device object and a new device icon corresponding to the new device object.

* * * * *